US008948523B2

(12) United States Patent
Oya

(10) Patent No.: US 8,948,523 B2
(45) Date of Patent: Feb. 3, 2015

(54) DATA PROCESSING METHOD IN TREE FORM AND DATA PROCESSING DEVICE

(76) Inventor: Nagato Oya, Shimotakai-county (JP)

(*) Notice: Subject to any disclaimer, the term of this patent is extended or adjusted under 35 U.S.C. 154(b) by 854 days.

(21) Appl. No.: 13/149,522

(22) Filed: May 31, 2011

(65) Prior Publication Data

US 2011/0231376 A1      Sep. 22, 2011

Related U.S. Application Data

(63) Continuation-in-part of application No. 13/128,713, filed as application No. PCT/JP2009/069299 on Nov. 12, 2009.

(30) Foreign Application Priority Data

Nov. 13, 2008   (JP) ................... 2008-291540

(51) Int. Cl.
   *G06K 9/36*          (2006.01)
(52) U.S. Cl.
   USPC ......................................... 382/232
(58) Field of Classification Search
   None
   See application file for complete search history.

(56) References Cited

U.S. PATENT DOCUMENTS

| 6,055,336 | A  | * | 4/2000  | Niki ............................. 382/237 |
| 6,978,050 | B2 | * | 12/2005 | Hunter et al. ................. 382/275 |
| 7,170,529 | B2 | * | 1/2007  | Chang .......................... 345/604 |
| 7,200,279 | B1 | * | 4/2007  | Lin .............................. 382/274 |
| 7,453,498 | B2 | * | 11/2008 | Prentice et al. ............ 348/222.1 |
| 7,903,871 | B2 | * | 3/2011  | Kaplinsky et al. ............ 382/162 |
| 2003/0215156 | A1 | * | 11/2003 | Rieger .......................... 382/276 |
| 2005/0013357 | A1 |   | 1/2005  | Cheong et al. |
| 2005/0286778 | A1 |   | 12/2005 | Atsumi |
| 2006/0209346 | A1 |   | 9/2006  | Nakahara |
| 2008/0247672 | A1 | * | 10/2008 | Kaplinsky et al. ............ 382/300 |

FOREIGN PATENT DOCUMENTS

| JP | A-2005-510979    | 4/2005 |
| JP | A-2006-262436    | 9/2006 |
| WO | WO 2004/056084 A1 | 7/2004 |

OTHER PUBLICATIONS

C. Fahey, S. Hosten, N. Krieger, L. Timpe Least squares methods for equidistant tree reconstruction arXiv:0808.3979 (2008).*
Letscher Vector Weighted Voronoi Diagrams, and Delaunay Triangulations, CCCG 2007, Ottawa, Ontario, Aug. 20-22, 2007.*

(Continued)

*Primary Examiner* — Andrae S Allison
(74) *Attorney, Agent, or Firm* — Oliff PLC

(57) ABSTRACT

The data processing method reversibly processing data information input to a data processing device by a processing unit including a data volume reducing unit reducing a data volume of the data information, and a developing unit reconstructing data information reduced in the data volume reducing unit. The processing unit is structured by overlaying processing layers formed of a plurality of cells. The data volume reducing unit performs unit processing on each of the plurality of cells having the data information. The unit processing performs identification processing by a weight according to equivalence and distance of data from a cell group adjacent to the cells, and reduces the cells by each of the processing layers in an order from a lower layer to an upper layer of the processing layers until a data position existing on a time axis of the cells stops to thereby reduces the data volume.

22 Claims, 29 Drawing Sheets

(56) References Cited

OTHER PUBLICATIONS

Stanley, G. et al., "Reconstruction of Natural Scenes from Ensemble Responses in the Lateral Geniculate Nucleus," *The Journal of Neuroscience*, Sep. 15, 1999, pp. 8036-8042, vol. 19, No. 18.

Oya, N., Image Compression Technology Using the Centricity Concept, Jun. 2009, pp. 1-9 (with translation).

Oya, N., "Central Set Concept of n-Dimensional Spaces," *Technical Symposium and General Assembly of Mizar Japan*, 2008, pp. 16-19 (with Abstract).

International Search Report issued in International Application No. PCT/JP2009/069299 on Jan. 19, 2010 (with translation).

\* cited by examiner

Fig.2

TREE-FORM ALL DIRECTION TYPE
 [USED IN CIRCUIT PROCESSING OR THE LIKE]
PROCESSING IS PERFORMED IN VERTICAL AND
HORIZONTAL DIRECTIONS ■
(TREE FORM IS COMPLICATED)

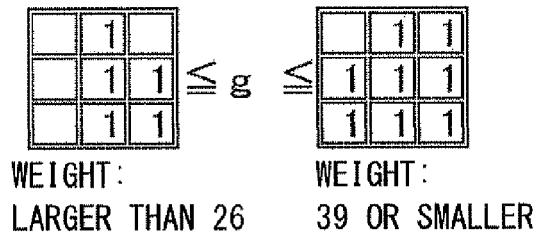 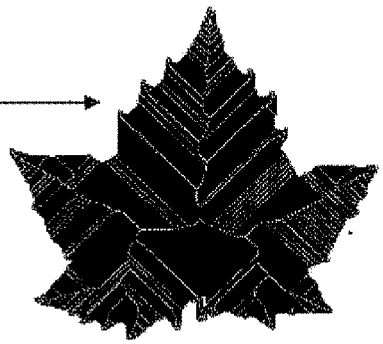

WEIGHT:　　　　WEIGHT:
LARGER THAN 26　39 OR SMALLER

TREE-FORM OBLIQUE DIRECTION TYPE
 [USED IN IMAGE PROCESSING OR THE LIKE]
PROCESSING IS PERFORMED IN OBLIQUE
DIRECTIONS ◆
(BRANCH FORM OF TREE)

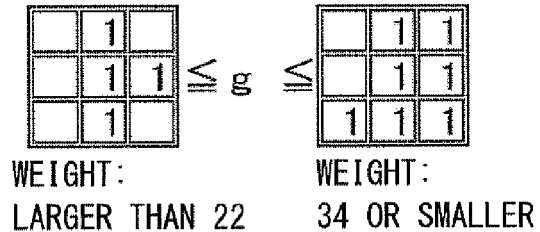 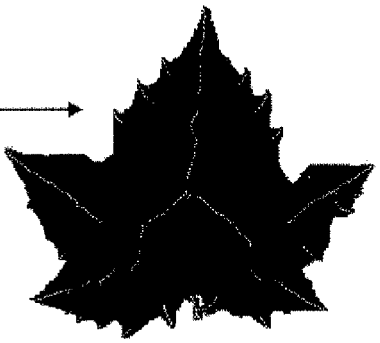

WEIGHT:　　　　WEIGHT:
LARGER THAN 22　34 OR SMALLER

1 IN CELL REPRESENTS PRESENCE OF DATA

Fig.6

LEFT LARGE NUMERALS DENOTE WEIGHT, RIGHT SMALL NUMERALS DENOTE LAYER NUMBER

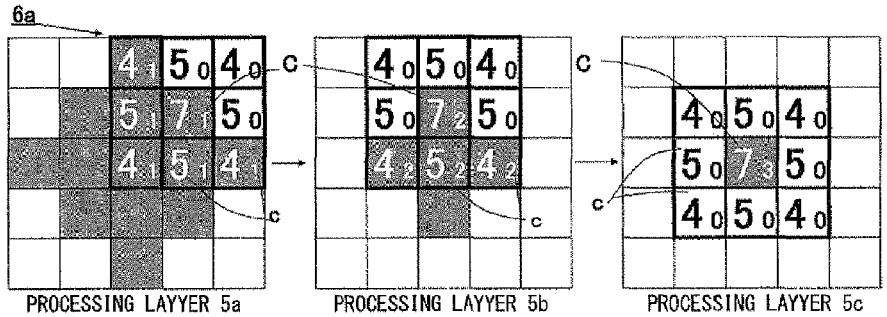

PROCESSING LAYYER 5a   PROCESSING LAYYER 5b   PROCESSING LAYYER 5c

WHEN DIRECTION OF PERFORMING REDUCTION OR THE LIKE IS DETERMINED,
IT IS CONSIDERED BY DIVIDING INTO FOUR, AND DEPENDING ON CONDITION IN
DIAGONALLY LOCATED CELLS, DELETION IS NOT PERFORMED IRRESPECTIVE OF WEIGHT

WEIGHT IS 33 MEANING DELETION, BUT DELETION IS NOT PERFORMED BECAUSE E=H AND F=G

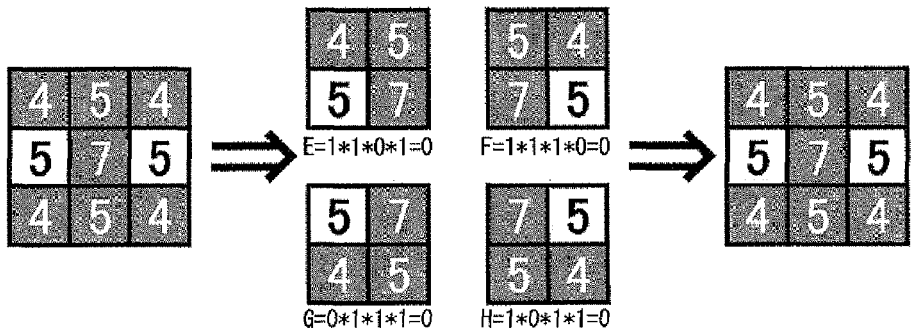

WEIGHT IS 31 MEANING DELECTION, BUT DELETION IS NOT PERFORMED BECAUSE E≠H AND F≠G

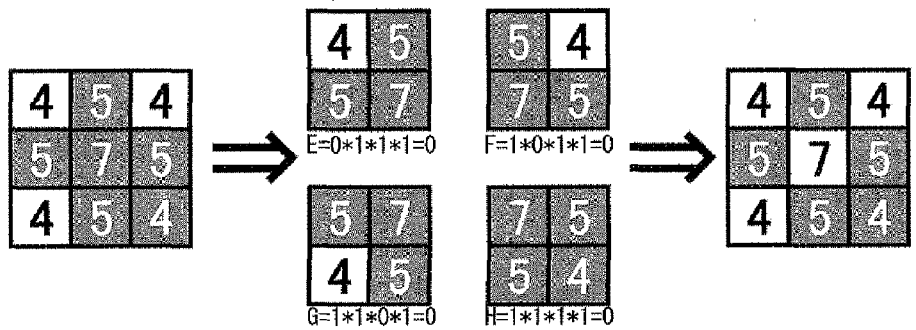

ALTHOUGH CENTER VALUE IS REDUCED ONCE, WHEN SURROUNDING VALUES ARE CONGENERIC
AND 20, 14 OR THE LIKE, HIERAECHY IN WHICH DELETION TAKES PLACE IS DECREASED BY ONE
, AND VALUES CAN BE AGGREGATED TO CENTER

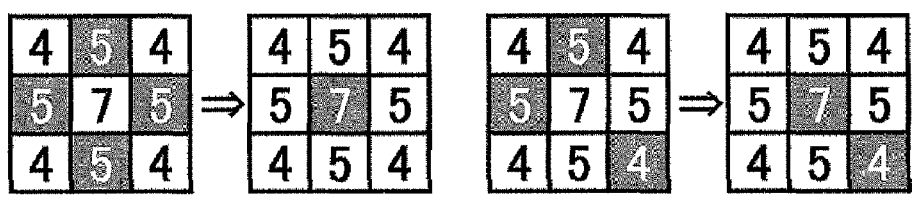

Fig.8A
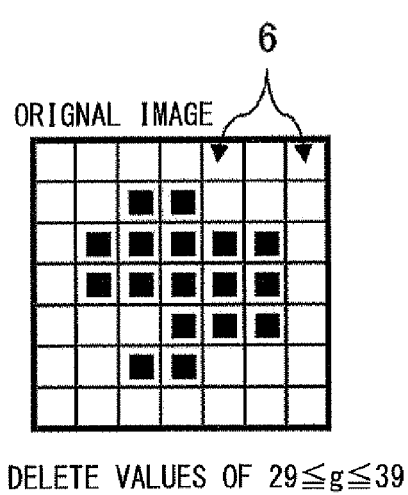
ORIGNAL IMAGE
DELETE VALUES OF $29 \leqq g \leqq 39$
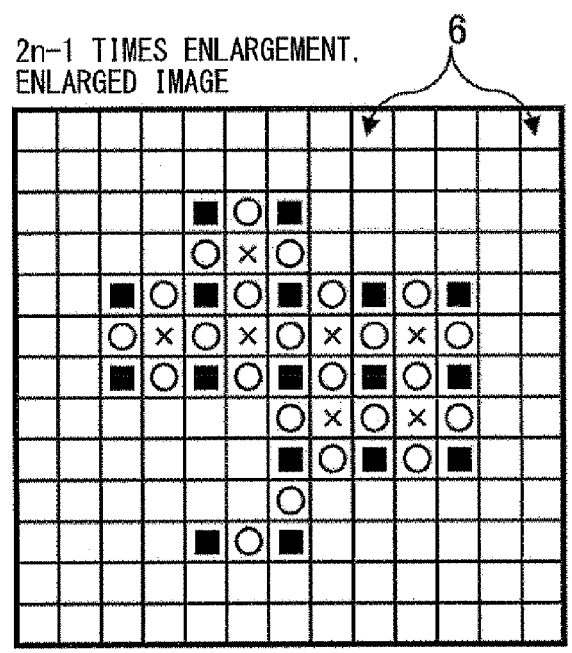
2n-1 TIMES ENLARGEMENT,
ENLARGED IMAGE

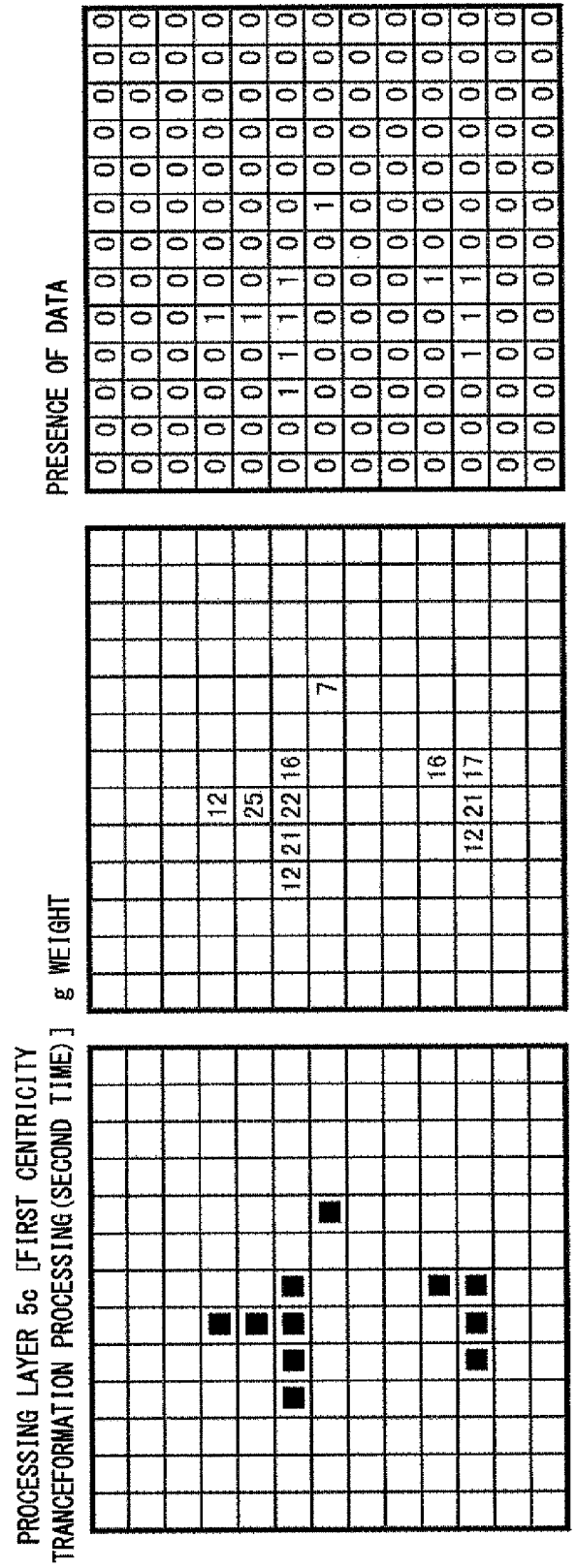

PROCESSING LAYER NUMBER
(PROCESSING TIME)

LEFT LARGE NUMERALS DENOTE WEIGHT, RIGHT SMALL NUMERALS DENOTE LAYER NUMBER.
UNDER THIS CONDITION, PROCESSING IS PERFORMED WHEN WEIGHT IS 5 OR LARGER.

Fig.12A
ENLARGING PROCESSING
ENLARGED IMAGE OF PROCESSING LAYER 5c, (2(2n-1)-1 × (2(2m-1))-1)
[FIRST CENTRICITY TRANCEFORMATION PROSECCING(SECOND TIME)]
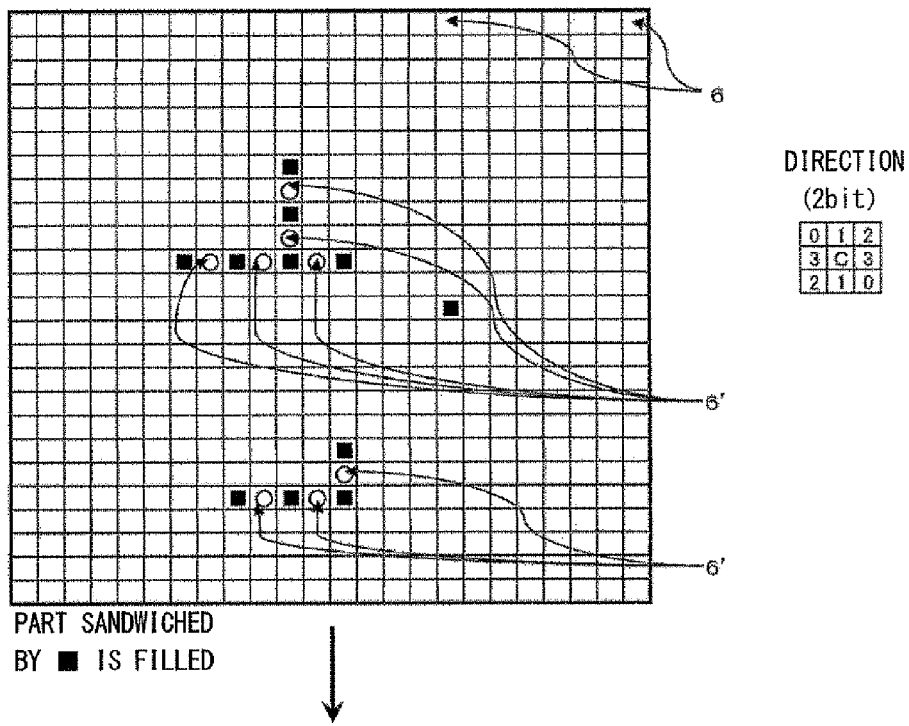
DIRECTION
(2bit)
PART SANDWICHED
BY ■ IS FILLED
↓
PROCESSING LAYER 5d, (2(2n-1)-1 × (2(2m-1)-1)
[FIRST CENTRICITY TRANCEFORMATION PROSECCING(SECOND TIME) IS FINISHED]
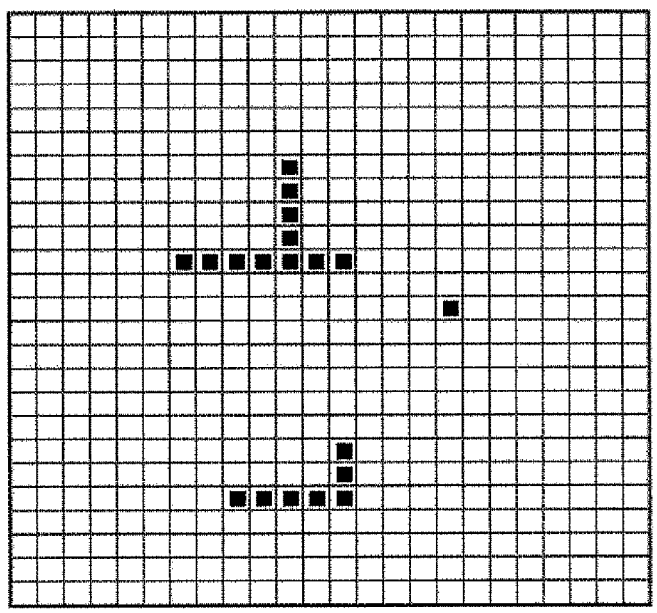

Fig.12B
SECOND CENTRICITY TRANSFORMATION PROCESSING
PROCESSING LAYER 5e
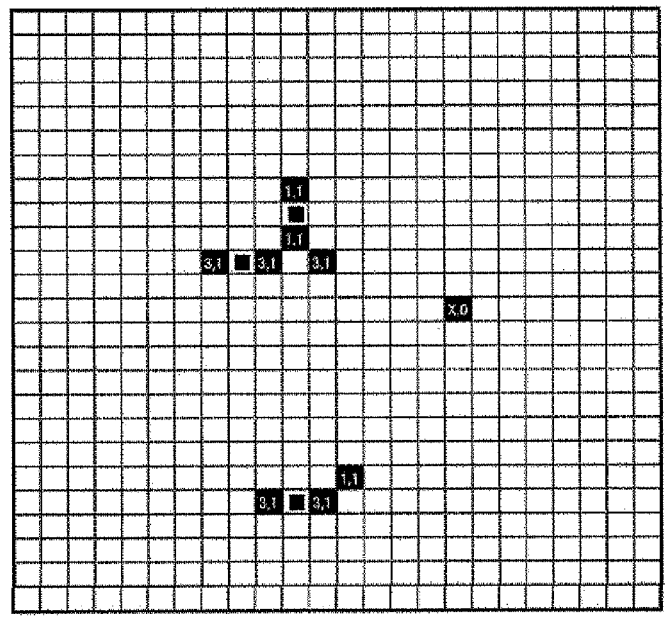
DESCRIBED IN ORDER OF (DIRECTION, VOLUME)
WHEN VOLUME IS 0, THERE IS NO CHANGE AND THUS
DIRECTION IS X
PROCESSING LAYER 5f [SECOND CENTRICITY
TRANSFORMATION PROCESSING, FINISHED]
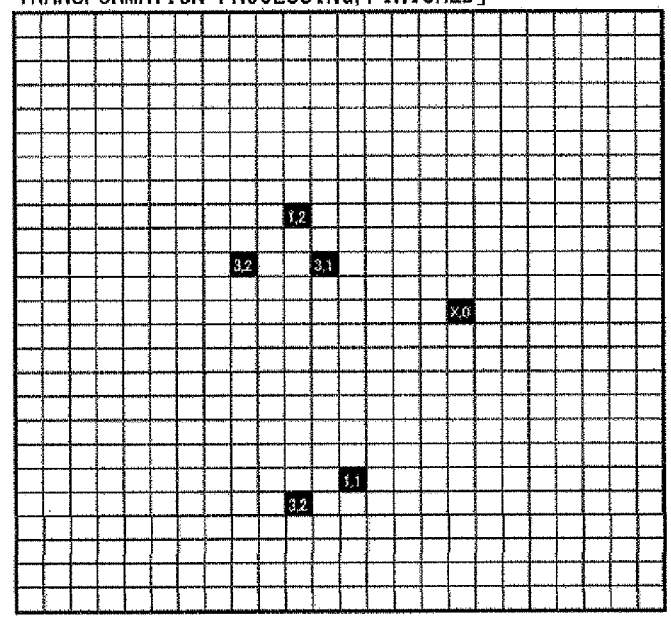

Fig.16

| (X,Y,Z) | VALUES IN (X, Y, Z) PARTS | PRESENCE OF DATA AT (X, Y, Z) |
|---|---|---|
| (0,0,3) | 5 | 1 |
| (0,1,3) | 0 | 0 |
| (1,0,3) | 0 | 0 |
| (1,1,3) | 0 | 0 |
| (2,0,3) | 0 | 0 |
| (2,1,3) | 0 | 0 |
| (0,0,2) | 0 | 0 |
| (0,1,2) | 0 | 0 |
| (1,0,2) | 0 | 0 |
| (1,1,2) | 3 | 1 |
| (2,0,2) | 0 | 0 |
| (2,1,2) | 2 | 1 |
| (0,0,1) | 0 | 0 |
| (0,1,1) | 0 | 0 |
| (1,0,1) | 0 | 0 |
| (1,1,1) | 6 | 1 |
| (2,0,1) | 0 | 0 |
| (2,1,1) | 0 | 0 |
| (0,0,0) | 0 | 0 |
| (0,1,0) | 0 | 0 |
| (1,0,0) | 0 | 0 |
| (1,1,0) | 3 | 1 |
| (2,0,0) | 0 | 0 |
| (2,1,0) | 7 | 1 |

3bit × 24=72bit

FIG.17

| (X,Y) | PRESENCE OF DATA WHEN XY PLANE IS SEEN IN Z-AXIS DIRECTION |
|---|---|
| (0,0) | 1 |
| (0,1) | 0 |
| (1,0) | 0 |
| (1,1) | 1 |
| (2,0) | 0 |
| (2,1) | 1 |

VOLUME DATA   SHOW 3 bit ⇒ 6
              1bit × 6

| (X,Y) | NUMBER OF DATA WHEN XY PLANE IS SEEN IN Z-AXIS DIRECTION |
|---|---|
| (0,0) | 1 |
| (1,1) | 3 |
| (2,1) | 2 |

SHOW 2 bit ⇒ 3
2bit × 3

⇕ INVERTIBLE TRANSFORMATION

| (X,Y) | PRESENCE OF DATA WHEN XY PLANE IS SEEN IN Z-AXIS DIRECTION |
|---|---|
| (0,0) | 1 |
| (0,1) | 0 |
| (1,0) | 0 |
| (1,1) | 3 |
| (2,0) | 0 |
| (2,1) | 2 |

Fig.18

| (X,Y,Z) | PRESENCE DATA WHEN SEEN IN ORDER DOWNWARD FROM UPPER LAYER TO LOWER LAYER FROM FIG. 17 | (X,Y,Z) | DATA VALUE WHEN SEEN IN ORDER DOWNWARD FROM UPPER LAYER TO LOWER LAYER FROM FIG. 17 |
|---|---|---|---|
| (0,0,3) | 1 | (0,0,3) | 5 |
| (1,1,3) | 0 | (1,1,2) | 3 |
| (2,1,3) | 0 | (2,1,2) | 2 |
| (1,1,2) | 1 | (2,1,1) | 6 |
| (2,1,2) | 1 | (1,1,0) | 3 |
| (1,1,1) | 0 | (2,1,0) | 7 |
| (2,1,1) | 1 | | |
| (1,1,0) | 1 | | |
| (2,1,0) | 1 | | |

⇕ INVERTIBLE TRANSFORMATION

| (X,Y,Z) | PRESENCE DATA WHEN SEEN IN ORDER DOWNWARD FROM UPPER LAYER TO LOWER LAYER FROM FIG. 17 |
|---|---|
| (0,0,3) | 5 |
| (1,1,3) | 0 |
| (2,1,3) | 0 |
| (1,1,2) | 3 |
| (2,1,2) | 2 |
| (1,1,1) | 0 |
| (2,1,1) | 6 |
| (1,1,0) | 3 |
| (2,1,0) | 7 |

FIG.20A
FIG.20B
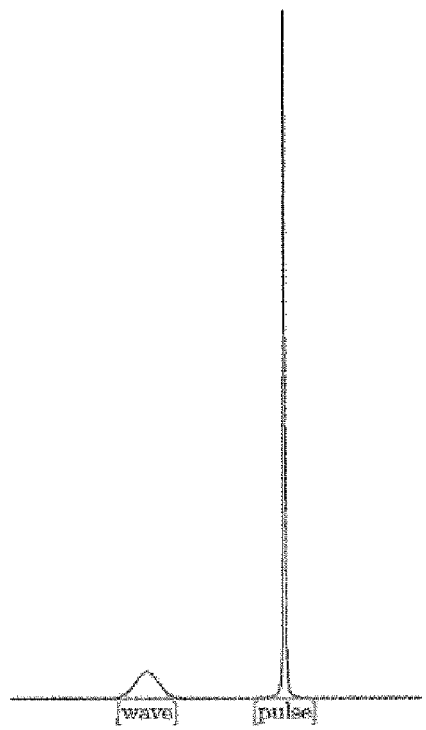
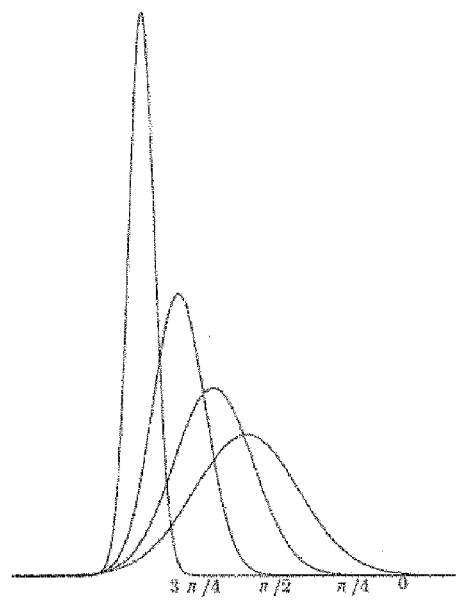
FIG.20C
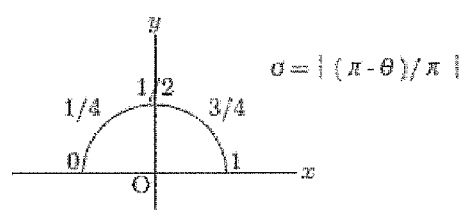
$\sigma = |(\pi - \theta)/\pi|$
FIG.20D
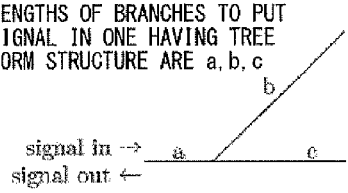

GRADATIONS FROM BLUE TO YELLOW

CONSIDERING (a) BY GROUPING WHEN VALUE IS EQUAL TO OR LARGER THAN THREHOLD, AND PROCESSING IS PERFORMED BY DIVIDING INTO B AREA AND Y AREA

AFTER RECONSTRUCTION TO STATE OF (b) FROM TREE FORM, SMOOTHING IS PERFORMED TO RECONSTRUCT TO ORIGINAL (a) WHEN BOUNDARY VALUE OF BY IS THRESHOLD + $\alpha$

Fig.22A

DISTANCE SPACE IS FIXED

| RANGE | 1 | | | | 2 | | | | 3 | | | 1 | | | | 2 | | | | 3 | | |
|---|---|---|---|---|---|---|---|---|---|---|---|---|---|---|---|---|---|---|---|---|---|---|
| SECTION | 1 | 2 | 3 | 4 | 5 | 6 | 7 | 8 | 9 | | | 1 | 2 | 3 | 4 | 5 | 6 | 7 | 8 | 9 | | |
| COORDINATE DISTANCE FROM BARYCENTER | 4 | 3 | 2 | 1 | 0 | 1 | 2 | 3 | 4 | | | 4 | 3 | 2 | 1 | 0 | 1 | 2 | 3 | 4 | | |

○:DENOTING BARYCENTER

| SQUARE OF DISTANCE FROM BARYCENTER | 32 | 25 | 20 | 0 | 0 | 0 | 20 | 25 | 32 | | 32 | 0 | 20 | 0 | 0 | 0 | 20 | 0 | 32 |
|---|---|---|---|---|---|---|---|---|---|---|---|---|---|---|---|---|---|---|---|
| | 25 | 18 | 13 | 0 | 0 | 0 | 13 | 18 | 25 | | 0 | 18 | 0 | 0 | 0 | 0 | 0 | 18 | 0 |
| | 20 | 13 | 8 | 0 | 0 | 0 | 8 | 13 | 20 | | 20 | 0 | 8 | 0 | 0 | 0 | 8 | 0 | 20 |
| (x_i)^2 | 0 | 0 | 0 | 1 | 0 | 1 | 0 | 0 | 0 | | 0 | 0 | 0 | 0 | 0 | 0 | 0 | 0 | 0 |
| | 0 | 0 | 0 | 0 | 0 | 0 | 0 | 0 | 0 | | 0 | 0 | 0 | 2 | 0 | 2 | 0 | 0 | 0 |
| | 0 | 0 | 0 | 2 | 0 | 2 | 0 | 0 | 0 | | 0 | 0 | 0 | 0 | 0 | 0 | 0 | 0 | 0 |
| | 20 | 13 | 8 | 0 | 0 | 0 | 8 | 13 | 20 | | 20 | 0 | 8 | 0 | 0 | 0 | 8 | 0 | 20 |
| | 25 | 18 | 13 | 0 | 0 | 0 | 13 | 18 | 25 | | 0 | 18 | 0 | 0 | 0 | 0 | 0 | 18 | 0 |
| | 32 | 25 | 20 | 0 | 0 | 0 | 20 | 25 | 32 | | 32 | 0 | 20 | 0 | 0 | 0 | 20 | 0 | 32 |

| ENTROPY : $(\Sigma x^2)/2$ | 354 | 200 |
|---|---|---|
| RANGE:L | 3 | 3 |
| SECTION SIZE:m | 1 | 1 |
| FINE UNIT ħ: $(L^2)/m$ | 9 | 9 |
| UNIQUE SHAPE VALUE:ENTROPY/ $(ħ^2)$ | 4.37037 | 2.46914 |

Fig.23B

ENLARGEMENT

■ FINE UNIT ℏ IS 1

○ THIS MARK DENOTES BABYCENTOR

■ FINE UNIT IS 2

■ FINE UNIT IS 3

| FINE UNIT | 1 |
|---|---|
| DISTANCE A | 0.5000 |
| EFFECTIVE CELL A | 2 |
| DISTANCE B | 1.1180 |
| EFFECTIVE CELL B | 2 |
| DISTANCE C | 2.0616 |
| EFFECTIVE CELL C | 2 |
| ENTROPY | 5.7500 |
| UNIQUE SHAPE VALUE | 5.7500 |

| FINE UNIT | 2 |
|---|---|
| DISTANCE A | 1.0000 |
| EFFECTIVE CELL A | 2 |
| DISTANCE B | 2.2361 |
| EFFECTIVE CELL B | 2 |
| DISTANCE C | 4.1231 |
| EFFECTIVE CELL C | 2 |
| ENTROPY | 23.0000 |
| UNIQUE SHAPE VALUE | 5.7500 |

| FINE UNIT | 3 |
|---|---|
| DISTANCE A | 1.5000 |
| EFFECTIVE CELL A | 2 |
| DISTANCE B | 3.3541 |
| EFFECTIVE CELL B | 2 |
| DISTANCE C | 6.1847 |
| EFFECTIVE CELL C | 2 |
| ENTROPY | 51.7500 |
| UNIQUE SHAPE VALUE | 5.7500 |

DATA PROCESSING METHOD IN TREE FORM AND DATA PROCESSING DEVICE

CROSS-REFERENCE TO THE RELATED APPLICATIONS

This application is a continuation-in part application of U.S. patent application Ser. No. 13/128,713, filed May 11, 2011, which is a U.S. National Stage application claiming the benefit of prior filed International Application Number PCT/JP2009/069299, filed Nov. 12, 2009, in which the International Application claims a priority date of Nov. 13, 2008 based on prior filed Japanese Application Number 2008-291540, the entire contents of which are incorporated herein by reference.

BACKGROUND

1. Field

The present application relates to a data processing method and a data processing device for processing input data information, and more particularly relates to a data processing method and a data processing device which enable reversible processing by which the volume of data can be reduced efficiently with as little degradation to the original state of data as possible when data of an image, sound, logic, control, and so on which are compressed for transmission or the like are reconstructed.

2. Description of the Related Art

Currently, an image of one screen represented on a display with, for example, 600 vertical dots and 400 horizontal dots in an electronic apparatus such as a personal computer has an enormous total data amount of $600 \times 400 \times 256^3$, given that 1 dot on the screen has 24-bit color information. When such an image is transmitted via communication means such as the Internet, CPU processing for processing the vast amount of data takes time, and a large amount of memory resource is consumed. Thus, there are techniques for reducing the volume of data by compressing data of the original image in various formats.

As one of such compression techniques, for example, JPEG (Joint Photographic coding Experts Group), GIF (Graphics Interchange Format), and so on are widely used, as described in International Publication No. 2004/56084 or the like. The JPEG format is such that image data are converted into a frequency, and when such frequency data are quantized, high-frequency components having a low amount of data compared to low-frequency components become 0 by quantization, and the overall data volume is compressed by this amount. Further, in the GIF format, an image is scanned line by line in a horizontal direction, and portions in which the same color is repeated are grouped, thereby achieving compression of the total data volume.

In conventional compression methods enabling various types of reversible compression, such as the aforementioned JPEG format and GIF format, degradation of image occurs more than a little when the compressed data are reconstructed, due to noise generated in data compression, compression exceeding supported color number, extraction of portions with the same attribute in a predetermined range, and so on. Accordingly, there is desired a capability of reducing the data volume of an image with as little degradation of the original image as possible, and studies aiming at further improvement in precision and compression rate are conducted every day with these compression methods.

The present inventor was astonished by a study in a previously released paper (J. Neuroscience vol. 19 p. 8036-8042, Reconstruction of Natural Scenes from Ensemble Responses in the Lateral Geniculate Nucleus, 1999) such that an animal sees an image of a "flower" or the like seen through the visual cortex while keeping the original shape by beautifully turning the flower into a tree form via in-brain processing. This is an image obtained by checking 177 neurons in the visual cortex with a tester and reconstructing them. In this brain, processing of information of the image and so on is performed efficiently through respective layers of neurons formed of a multi-layer structure.

Accordingly, the present inventor has completed a novel image processing form and processing method resembling brain synapses by which the volume of data can be reduced with little degradation of the original image by applying a processing mode of information obtained from visual perception in a brain and using this mode with computer technology.

Therefore, a proposition of the present application is to provide a data processing method and a processing circuit including a data processing device which both enable reversible processing by which the volume of data of an image, sound, logic, control, and so on can be reduced efficiently and significantly with as little degradation to the original state of the data as possible when the data are reconstructed.

SUMMARY

Therefore, the embodiment described in claim 1 is a data processing method reversibly processing data information input to a data processing device by a processing unit including a data volume reducing unit reducing a data volume of the data information, and a developing unit reconstructing data information reduced in the data volume reducing unit, in which the processing unit is structured by overlaying processing layers formed of a plurality of cells; the data volume reducing unit performs unit processing on each of the plurality of cells having the image information; and the unit processing performs identification processing by a weight according to equivalence and distance of data from a cell group adjacent to the cells, reduces the cells by each of the processing layers in an order from a lower layer to an upper layer of the processing layers until a data position existing on a time axis of the cells stops (hereinafter abbreviated as remain) to thereby reduces the data volume, and processes the data in a record analyze control unit.

The embodiment described in claim 2 is the data processing method according to claim 1, in which the method sets a cell which needs to determine whether or not a reduction of the cells is performed as a center cell, and sets a plurality of cell groups existing around the center cell as a group, in which the group is made by simplifying and unifying an operation of a neuron synapse and enables parallel processing by combining the cells.

The embodiment described in claim 3 is the data processing method according to claim 1, in which the data volume reducing unit further reduces the center cell located at end points of a straight line coupling the center cell being remained in the processing layers to be perpendicular to the processing layers.

The embodiment described in claim 4 is the data processing method according to claim 1, in which the cells record a reduction status of the data information.

The embodiment described in claim 5 is the data processing method according to claim 1, in which the data volume reducing unit reduces the data information of n dimension in n-dimensional space to data information of (n−1)-dimensional composite body in (n+1)-dimensional space.

The embodiment described in claim 6 is the data processing method according to claim 1, in which the data volume reducing unit reduces the data information of (n−1) dimension in (n+1)-dimensional space to O-dimensional (point form) data information on $2^{n-1}(n+1)$ dimension.

The embodiment described in claim 7 is the data processing method according to claim 1, in which the identification processing is weighting processing of assigning and adding a weight.

The embodiment described in claim 8 is the data processing method according to claim 1, in which the developing unit reconstructs the cells being reduced in order from the upper layer to the lower layer of the processing layers.

The embodiment described in claim 9 is the data processing method according to claim 1, in which the processing unit reduces and develops the data information for each similar data.

The embodiment described in claim 10 is the data processing method according to claim 1, in which the record analyze control unit includes a method transforming a tree-formed data structure into a pulse signal and a method inputting/outputting and controlling data to retrieve and construct a tree-formed structure from the pulse signal, in which the record analyze control unit controls a flow of other data by performing data masking on a circuit.

The embodiment described in claim 11 is the data processing method according to claim 1, in which the data information is an image, a sound, logic, and control.

The embodiment described in claim 12 is a data processing device reversibly processing data information input to a data processing device by a processing unit including a data volume reducing unit reducing a data volume of the data information, and a developing unit reconstructing data information reduced in the data volume reducing unit, in which the processing unit is structured by overlaying processing layers formed of a plurality of cells; the data volume reducing unit performs unit processing on each of the plurality of cells having the data information; and the unit processing performs identification processing by a weight according to equivalence and distance of data from a cell group adjacent to the cells, reduces the cells by each of the processing layers in an order from a lower layer to an upper layer of the processing layers until a data position existing on a time axis of the cells stops to thereby reduces the data volume, and processes the data in a record analyze control unit.

The embodiment described in claim 13 is the data processing device according to claim 12, in which the method sets a cell which needs to determine whether or not a reduction of the cells is performed as a center cell, and sets a plurality of cell groups existing around the center cell as a group, in which the group is made by simplifying and unifying an operation of a neuron synapse and enables parallel processing by combining the cells. The embodiment described in claim 14 is the data processing device according to claim 12, in which the data volume reducing unit further reduces the center cell located at end points of a straight line coupling the center cell being remained in the processing layers to be perpendicular to the processing layers. The embodiment described in claim 15 is the data processing device according to claim 12, in which the cells record a reduction status of the data information.

The embodiment described in claim 16 is the data processing device according to claim 12, in which the data volume reducing unit reduces the data information of n dimension in n-dimensional space to data information of (n−1)-dimensional composite body in (n+1)-dimensional space.

The embodiment described in claim 17 is the data processing device according to claim 12, in which the data volume reducing unit reduces the data information of (n−1) dimension in (n+1)-dimensional space to O-dimensional point form data information in $2^{n-1}(n+1)$-dimensional space.

The embodiment described in claim 18 is the data processing device according to claim 12, in which the identification processing is weighting processing of assigning and adding a weight. The embodiment described in claim 19 is the data processing method according to claim 12, in which the developing unit reconstructs the cells being reduced in order from the upper layer to the lower layer of the processing layers.

The embodiment described in claim 20 is the data processing device according to claim 12, in which the processing unit reduces and develops the data information for each similar data.

The embodiment described in claim 21 is the data processing device according to claim 12, in which the record analyze control unit of the data includes a method transforming a tree-formed data structure into a pulse signal and inputs/outputs and controlling data to retrieve, record, and construct a tree-formed structure from the pulse signal, and controls a flow of other data by performing data masking on a circuit.

The embodiment described in claim 22 is the data processing device according to claim 12, in which the data information is an image, a sound, logic, and control.

The embodiment described in claim 1 is a data processing method reversibly processing data information input to a data processing device by a processing unit formed of a data volume reducing unit reducing a data volume of the data information, and a developing unit reconstructing data information reduced in the data volume reducing unit, in which the processing unit is structured of overlaid processing layers formed of a plurality of cells; the data volume reducing unit performs unit processing on each of the plurality of cells having the data information; and in the unit processing, identification processing is performed by a weight according to equivalence and distances of data from a cell group adjacent to the cells, the cells are reduced in each processing layer in order from a lower layer to an upper layer of the processing layers until a center cell which is a point on an image on which attention is focused is left to thereby reduce the data volume, and those data are processed in the record analyze control unit. Thus, data information of an image, sound, logic control, and so on in units of cell groups can be subjected to the unit processing of serial type in the order of processing layers similarly to in-brain processing, and the congeneric ratio in a cell group can be determined to reduce center cells. Accordingly, the data information can be reduced quickly and efficiently. Therefore, it is possible to provide a data processing method by which the volume of data can be reduced efficiently.

In the embodiment described in claim 2, a cell where it is needed to determine presence of reduction of the cells is defined as a center cell, a plurality of cell groups existing around the center cell is defined as a group, the group is made by simplifying and unifying operation of neuron synapse, and the cells are combined to enable parallel processing. Thus, data information can be reversibly processed efficiently. Therefore, it is possible to provide a data processing method by which the volume of data can be reduced efficiently.

In the embodiment described in claim 3, the data volume reducing unit further reduces the center cell located at end points of a straight line coupling the center cells remaining in the processing layers to be perpendicular to the processing layers. Thus, in center cells which are reduced and left as first centricity transformation processing, the data volume can be reduced more by further reducing a part of these center cells as much as possible. Therefore, it is possible to provide a data processing method by which the volume of data can be reduced efficiently and largely.

Here, as a transmission condition, as illustrated in FIG. 1 which is a schematic diagram illustrating flow of data by the data processing method of the present application, cells c exit in a layer form in a state like piecrusts of a sweet stuff, and interference of data in processing layers 5 is prohibited. However, transmission of data to the next processing layer 5 is allowed. Further, as another transmission condition, when signals are not synchronous, that is, base time S<Δt=|t1 (first signal from one way of surrounding cells in a downward direction)−t2 (last signal from the other way of the surrounding cells in the downward direction)| is true, it is considered as not synchronous that the cells do not transmit a signal to the next processing layer. Moreover, as illustrated in FIG. 2 which is an explanatory diagram of a reduction pattern of center cells, as a transmission condition, the surrounding cells c which can determine whether to transmit a data signal to the next processing layer by the weighted sum g of a data signal from the cells c of the previous processing layer are weighted, the weights of the cells c are added to judgment values when surrounding data exist, and the judgment values are compared, to thereby determine whether to transmit information or not. As determination regarding the weighted sum g of the cells c, there are three patterns of 0≤g<L (lowest reference value), L≤g≤H (highest reference value), and H<g≤Max (maximum value). However, when data of center cells do not exist, g is set to 0.

In the embodiment described in claim 4, the cells record a reduction status of the data information by the form of positions of individual cells. Thus, when data information is reconstructed by the developing unit, cells reduced based on this record can be easily and quickly reconstructed. Therefore, it is possible to provide a data processing method by which data information can be reconstructed efficiently and quickly.

In the embodiment described in claim 5, the data volume reducing unit reduces the data information of n dimension in an n-dimensional space to data information of (n−1)-dimensional composite body in (n+1)-dimensional space. Thus, when an image of ellipse or square shape having planar, two-dimensional information on a display for example is represented by a time axis as processing between processing layers, it becomes simple one-dimensional linear image information, and the image information can be reduced efficiently during transmission through the processing layers. Therefore, it is possible to provide a data processing method by which the data volume can be reduced efficiently.

In the embodiment described in claim 6, the data volume reducing unit reduces the data information of (n−1) dimension in a (n+1)-dimensional space to 0-dimensional data information in a $2^{n-1}$(n+1)-dimensional space. Thus, the image information can be reduced efficiently during transmission through the processing layers. Therefore, it is possible to provide a data processing method by which the data volume can be reduced efficiently.

In the embodiment described in claim 7, the identification processing is weighting processing of assigning and adding a weight. Thus, weighting the cells forming one cell group by largeness/smallness of numeric values enables quick and easy identification of each cell and center cell. Thus, reduction and reconstruction processing of each cell can be performed quickly. Therefore, it is possible to provide a data processing method which enables reversible processing by which the volume of data can be reduced and reconstructed efficiently and quickly.

In the embodiment described in claim 8, the developing unit reconstructs the reduced cells in order from an upper layer to a lower layer of the processing layers. Thus, with the center cell of each cell group being a base point, cells which have been reduced can be securely and quickly reconstructed in the order of closeness to this center cell. Therefore, it is possible to provide a data processing method by which data information can be reconstructed efficiently and quickly.

In the embodiment described in claim 9, the processing unit reduces and develops the data information for every similar data. Thus, the data volume can be reduced more efficiently. Therefore, it is possible to provide a data processing method by which the data volume can be reduced efficiently.

In the embodiment described in claim 10, the record analyze control unit includes a method for transforming a tree-formed data structure into a pulse signal and a method for inputting/outputting and controlling data for retrieving and constructing a tree-formed structure from a pulse signal. Thus, with a reduced data volume, data can be stored and called efficiently and quickly. Therefore, the data volume can be reduced efficiently. While attenuating in a circular form corresponding to the distance from a certain point, the pulse signal is repeatedly transmitted, communicated, and received when it becomes a certain value. And first centricity transformation allows sectioning into fine parts and large parts, and it becomes possible to process recording and analyzing of signal data in parallel. Further, flow of other data is controlled by performing data masking in a circuit, and thus it is possible to provide a data processing method by which data can be stored, called, and reduced efficiently and quickly with a reduced data volume.

In the embodiment described in claim 11, the data information is an image, a sound, logic, and control that it is possible to efficiently send/receive these data information by reducing large amount of general data information. Therefore, it is possible to provide the data processing method efficiently reducing the data volume.

The embodiment described in claim 12 is a data processing device reversibly processing data information input to a data processing device by a processing unit formed of: a data volume reducing unit reducing a data volume of the data information; and a developing unit reconstructing data information reduced in the data volume reducing unit, in which: the processing unit is structured of overlaid processing layers formed of a plurality of cells; the data volume reducing unit performs unit processing on each of the plurality of cells having image information; and in the unit processing, identification processing is performed by a weight according to equivalence and distances of data from a cell group adjacent to the cells, the cells are reduced in each processing layer in order from a lower layer to an upper layer of the processing layers until a data position existing on a time axis of the cells stops to thereby reduce the data volume, and those data are processed in a record analyze control unit. Thus, data information in units of cell groups can be subjected to the serial processing in the order of processing layers similarly to in-brain processing, and the congeneric ratio in a cell group can be determined to reduce center cells. Accordingly, the data information can be reduced quickly and efficiently. Therefore, it is possible to provide a data processing device by which the volume of data can be reduced efficiently.

In the embodiment described in claim 13, a cell where it is needed to determine presence of reduction of the cells is defined as a center cell, a plurality of cell groups existing around the center cell is defined as a group, the group is made by simplifying and unifying operation of neuron synapse, and the cells are combined to enable parallel processing. Thus, data information can be reversibly processed efficiently. Therefore, it is possible to provide a data processing device by which the volume of data can be reduced efficiently. In the embodiment described in claim 14, the data volume reducing unit further reduces the center cell located at end points of a straight line coupling the center cells remaining in the processing layers to be perpendicular to the processing layers. Thus, in center cells which are reduced and left as first centricity transformation processing, the data volume can be reduced more by further reducing a part of these center cells as much as possible. Therefore, it is possible to provide a data processing device by which the volume of data can be reduced efficiently and largely. In the embodiment described in claim 15, the cells record a reduction status of the data information by the form of positions of individual cells. Thus, when data information is reconstructed by the developing unit, cells reduced based on this record can be easily and quickly reconstructed. Therefore, it is possible to provide a data processing device by which data information can be reconstructed efficiently and quickly.

In the embodiment described in claim 16, the data volume reducing unit reduces the data information of n dimension in an n-dimensional space to data information of (n−1)-dimensional composite body in (n+1)-dimensional space. Thus, when data of an image of ellipse or square shape or the like having planar, two-dimensional information on a display for example is represented by a time axis as processing between processing layers, it becomes simple one-dimensional linear data information, and the data information can be reduced efficiently during transmission through the processing layers. Therefore, it is possible to provide a data processing device by which the data volume can be reduced efficiently.

In the embodiment described in claim 17, the data volume reducing unit reduces the data information of (n−1) dimension in a (n+1)-dimensional space to 0-dimensional point form data information in a $2^{n-1}(n+1)$-dimensional space. Thus, the image information can be reduced efficiently during transmission through the processing layers. Therefore, it is possible to provide a data processing device by which the data volume can be reduced efficiently.

In the embodiment described in claim 18, the identification processing is weighting processing of assigning and adding a weight. Thus, weighting the cells forming one cell group by largeness/smallness of numeric values enables quick and easy identification of each cell and center cell. Thus, reduction and reconstruction processing of each cell can be performed quickly. Therefore, it is possible to provide a data processing device which enables reversible processing by which the volume of data can be reduced and reconstructed efficiently and quickly. In the embodiment described in claim 19, the developing unit reconstructs the reduced cells in order from an upper layer to a lower layer of the processing layers. Thus, with the center cell of each cell group being a base point, cells which have been reduced can be securely and quickly reconstructed in the order of closeness to this center cell. Therefore, it is possible to provide a data processing device by which data information can be reconstructed efficiently and quickly.

In the embodiment described in claim 20, the processing unit reduces and develops the data information for every similar data. Thus, the data volume can be reduced more efficiently. Therefore, it is possible to provide a data processing device by which the data volume can be reduced efficiently.

In the embodiment described in claim 21, the record analyze control unit of data includes a method for transforming a tree-formed data structure into a pulse signal and method for inputting/outputting and controlling data for retrieving and constructing a tree-formed structure from a pulse signal. Thus, with a reduced data volume, data can be stored and called efficiently and quickly. Therefore, the data volume can be reduced efficiently. While attenuating in a circular form corresponding to the distance from a certain point, the pulse signal is repeatedly transmitted, communicated, and received when it becomes a certain value. And first centricity transformation allows sectioning into fine parts and large parts, and it becomes possible to process recording and analyzing of signal data in parallel. Further, flow of other data is controlled by performing data masking in a circuit, and thus it is possible to provide a data processing device by which data can be stored, called, and reduced efficiently and quickly with a reduced data volume.

In the embodiment described in claim 22, the data information is an image, sound, logic, and control. Thus, largely reducing general data information allows to efficiently transmit/receive such data information. Therefore, it is possible to provide a data processing device by which the volume of data can be reduced efficiently.

BRIEF DESCRIPTION OF THE DRAWINGS

FIG. 2 is an explanatory diagram of a reduction pattern of center cells.

FIG. 6 is an identification example of cells with respect to one group of cells and a process diagram of cell reduction performed for each processing layer.

FIGS. 8A-8D are a reduction process diagram for groups of cells forming a part of ellipse image information.

FIGS. 12A-12C are a process diagram of second processing of groups of cells obtained by performing first processing on a part of ellipse image information.

FIG. 16 is a table illustrating one example in which image data are reduced to be discrete data.

FIG. 17 is a table illustrating an example of analyzing data of FIG. 16 in a z-axis direction.

FIG. 18 is a table illustrating an example of analyzing data of FIG. 16 in reverse order of the z-axis direction.

FIGS. 20A-20D are a graph illustrating signals performing reading and writing of a tree-form data structure.

FIGS. 22A-22B are a diagram illustrating shape entropy by shapes and unique shape values.

FIGS. 23A-23B are a diagram enlarged by sections.

DETAILED DESCRIPTION OF THE EMBODIMENTS

Figure 1:
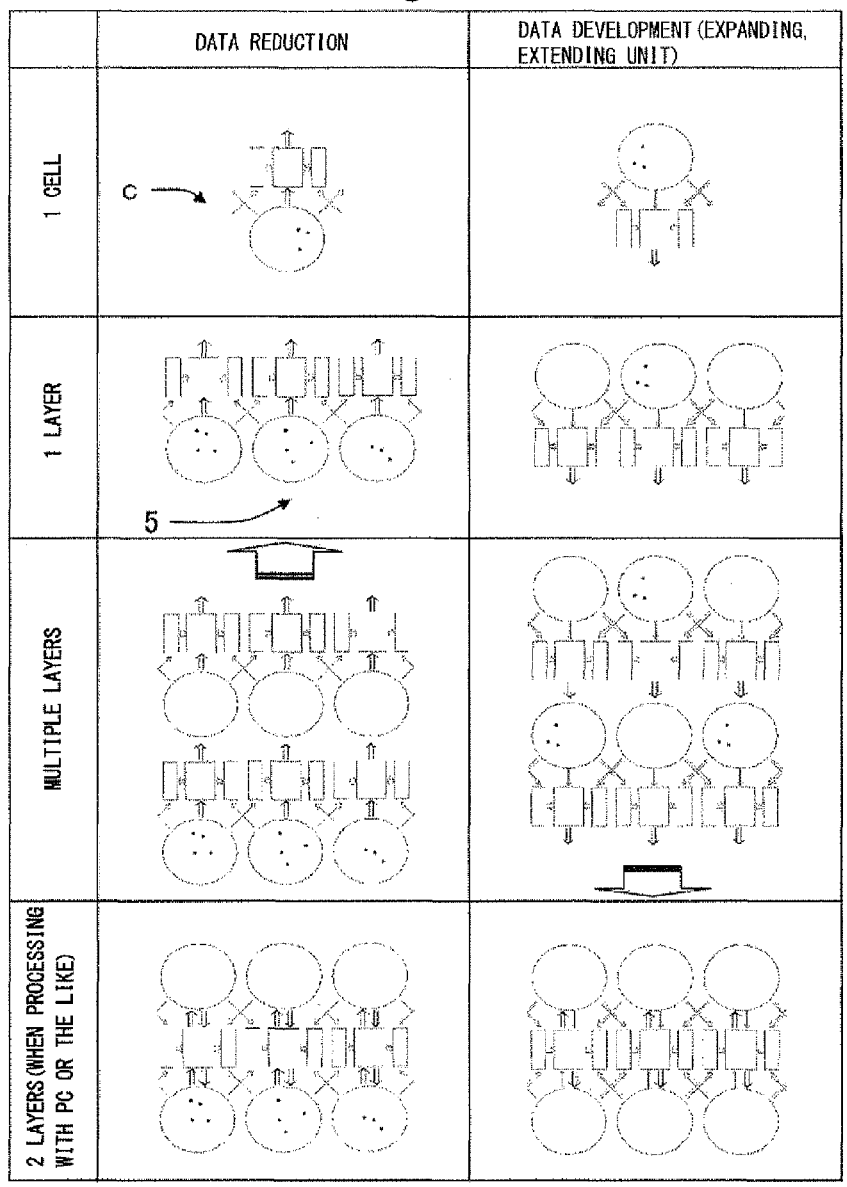
FIG. 1 is a schematic diagram illustrating flow of data by a data processing method of an embodiment of the present invention.

Regarding reduction of information, first, dimension set theory will be described. This theory is made by expanding transformation concept of analysis and forming a general form in consideration of centricity of a set. Transformation using this concept is reversible, for which various application fields such as image compression, artificial intelligence, and so on are conceivable. The n-dimensional continuous area $D^n$ (compact space) existing in the n-dimensional space $R^n$ is mapping transformed into (n−1)-dimensional continuous area $D^{n-1}$ existing in the (n+1)-dimensional space. Note that the dimension set theory described below is also described schematically in Journal of the Japan Society for Symbolic and Algebraic Computation, Vol. 16, No. 2, 18th Convention Lecture "Image compression technology using the centricity concept".

The centricity concept of n-dimensional space which is devised by the patent applicant will be described below.

[Equation 1]

Definition 1 n-Dimensional Sphere Internally Touching a Compact n-Dimensional Bounded Closed Set $D^n$ $D^n$ is a compact n-dimensional bounded closed set.

There is an n-dimensional spherical bounded closed set $S^n(p_i, r_i)$ having a radius $r_i$ with an inner point of a certain $D^n$, point $p_i$ being a center point, where i is an arbitrary integer.

At this time, distances $r_i$ from two points, $x_{i_1}, x_{i_2}$ present on a boundary $\partial D^n$ are equal, that is, $r_i$=distance($x_{i_1}, p_i$) and $r_i$=distance($x_{i_2}, p_i$) and $S^n(p_i, r_i) \subseteq D^n$ $\forall x_{i_1} \in \partial D^n \exists p_i \in \text{Interior}(D^n), x_{i_2} \in \partial S^n(p_i, r_i) \subseteq D^n, r_i \geq 0$ $x_{i_1}, x_{i_2} \in \partial D^n$ $S^n(p_i, r_i) \subseteq D^n$ $x_{i_1}, x_{i_2} \in \partial S^n(p_i, r_i)$ When Max($r_i$)=Min($r_i$)=0, $x_{i_1} = x_{i_2} = p_i$ and the set area is not smooth.

When Max($r_i$)>0, $x_{i_1} \neq x_{i_2}$, $p_i \in \text{Interior}(D^n)$ and the set area is smooth. In this case, there is always at least one point $x_{i_2}$ corresponding to the point $x_{i_1}$ of the boundary $\partial D^n$, and the point $p_i$ and the distance $r_i$ satisfying the above description are always present within $D^n$.

In other words, a sphere $S^n(p_i, r_i)$ internally touching two points of aDn always exists on n-dimensional sphere.

[Equation 2]

Definition 2 Centricity Transformation

A radius $r_i = \{x_{n+1}\}$, of an n-dimensional sphere obtained by definition 1 is of expanded to coordinates $p_i = \{x_1, x_2, \ldots, x_n\}$, and $P_i = \{x_1, x_2, \ldots, x_n, x_{n+1}\}$ is defined.

At this time, a linear area in two closed areas $[x_{i_1}, p_i], [x_{i_2}, p_i]$ of an n-dimensional space can be replaced with a point of $P_i$ of the (n+1)-dimensional space.

This transformation is defined as centricity transformation $\delta$.

Theorem 1. The centricity transformation $\delta$ from an n-dimensional continuous area $D^n$ in an n-dimensional space $R^n$ to (n+1)-dimensional space $R^{n+1}$, n−1 or less dimensional continuous area $D^{n-j}$ is possible.

$\forall D^n \subseteq R^n \exists \delta(D^n),$ $\{i_j, p_j, j, n\} \subset \mathbb{N}, 1 \leq j \leq n\delta(D^n) =$ $$\left(\bigcup_{i_1=1}^{p_1} D_{i_1}^{n-1}\right) \cup \left(\bigcup_{i_2=1}^{p_2} D_{i_2}^{n-2}\right) \cup \ldots \cup \left(\bigcup_{i_n=1}^{p_n} D_{i_n}^{0}\right) = \bigcup_{j=1}^{n}\left(\bigcup_{i_j=1}^{p_j} D_{i_j}^{n-j}\right) \subset R^{n+1}$$

The n-dimensional continuous area $D^n$ present in the n-dimensional space $R^n$ is $\delta$-transformed, and $\Sigma_{j=1}^{n} p_j$ number of n−1 present in (n+1)-dimensional space $R^{n+1}$ can be transformed into 0-dimensional continuous composite area $D_i^{n-j}$.

$$D^n \subset R^n$$

$$\delta(D^n) \downarrow$$

$$\bigcup_{j=1}^{n}\left(\bigcup_{i_j=1}^{p_j} D_{i_j}^{n-j}\right) \subset R^{n+1}$$

A portion where areas overlap exists, and this portion is a coupling portion which is n−2 or less dimensional.

$$\bigcap_{i_j=1}^{p_j} D_{i_j}^{n-j} = \bigcup_{k_1=1}^{s_1} T_{k_1}^{n-j-1} + \bigcup_{k_2=1}^{s_2} T_{k_2}^{n-j-2} + \ldots + \bigcup_{k_{n-j}=1}^{s_{n-j}} T_{k_{n-j}}^{0} =$$

$$\bigcup_{h=1}^{s_{n-j}}\left(\bigcup_{k_h=1}^{s_h} T_{k_h}^{n-j-h}\right), \bigcap_{k_h=1}^{s_h} T_{k_h}^{0} = \emptyset$$

There exist $\Sigma_{j=1}^{n} q_j$ number of uniformly continuous areas and s number of coupling portions. $T_k^{n-2}$ refers to a coupling portion of certain $D_{i_a}^{n-1}$ and $D_{i_b}^{n-1}$.

When it can be indicated that the entire $\partial D^n$ is covered by the (n−1)-dimensional plane $F^{n-1}$, the centricity transformation of $\delta^2$ or more is possible.

When a conditional expression $$\partial D^n = \bigcup_{u=0}^{w} F_u^{n-1}$$

is satisfied, the centricity transformation can be performed as follows.

$$\forall D^n = \bigcup_{j=0}^{n-1}\left(\bigcup_{i_j=1}^{p_{n,j}} D_{i_j}^{n-j}\right) \cup \left(\bigcup_{i_n=1}^{p_{n,n}} D_{i_n}^{0}\right) \subset R^n$$

$$\downarrow \delta$$

$$\exists \delta(D^n) = \bigcup_{j=1}^{n-1}\left(\bigcup_{i_{j-1}=1}^{p_{n-1,j-1}} D_{i,j-1}^{n-j}\right) \cup \left(\bigcup_{k=0}^{1}\left(\bigcup_{i_n=1}^{p_{n-k,n-k}} D_{i_n}^{k-1}\right)\right) \subset R^{n+1}$$

$$\downarrow \delta$$

-continued $$\exists \delta^2(D^n) = \bigcup_{j=2}^{n-1}\left(\bigcup_{i_{j-2}=1}^{p_{n-2,j-2}} D_{i_{j-2}}^{n-j}\right) \cup \left(\bigcup_{k=0}^{2}\left(\bigcup_{i_n=1}^{p_{n-k,n-k}} D_{i_n}^{k-2}\right)\right) \subset R^{2(n+1)}$$

$$\vdots \qquad \vdots \qquad \vdots$$

$$\exists \delta^r(D^n) = \bigcup_{j=r}^{n-1}\left(\bigcup_{i_{j-r}=1}^{p_{n-r,j-r}} D_{i_{j-r}}^{n-j}\right) \cup \left(\bigcup_{k=0}^{r}\left(\bigcup_{i_n=1}^{p_{n-k,n-k}} D_{i_n}^{k-r}\right)\right) \subset R^{2r(n+1)}$$

$$\vdots \qquad \vdots \qquad \vdots$$

$$\exists \delta^n(D^n) = \bigcup_{k=0}^{n}\left(\bigcup_{i_n=1}^{p_{n-k,n-k}} D_{i_n}^{k-n}\right) \subset R^{2^n(n+1)}$$

All the areas can be converged into a $2^n(n+1)$-dimensional point group.

However, pores may be generated in the continuous area with respect to transformation of $\delta^2$ or more, resulting in discrete values.

[Equation 3]

Definition 3 Inverse Transformation

A certain n−1 or less-dimensional continuous area $D^{n-1}$ in the (n+1)-dimensional space $R^{n+1}$ is mapping transformed, and there exists inverse transformation $\delta^{-1}$ into an arbitrary n-dimensional continuous area $D^n$ in the n-dimensional space $R^n$ and is defined uniquely.

$$\bigcup_{j=1}^{n}\left(\bigcup_{i,j=1}^{p_j} D_{i,j}^{n-j}\right) \subset R^{n+1}$$

$$\delta^{-1}\left(\bigcup_{i,j=1}^{p_j} D_{i,j}^{n-j}\right)\downarrow$$

$$D^n \subset R^n$$

A set $D^0$ of points in the $2^n(n+1)$-dimensional space is mapping transformed, and there exists inverse transformation $\delta^{-n}$ into an arbitrary n-dimensional continuous area $D^n$ in the n-dimensional space $R^n$ and is defined uniquely.

$$\exists D^0 = \bigcup_{k=0}^{n}\left(\bigcup_{i_n=1}^{p_{n-k,n-k}} D_{i_n}^{k-n}\right) \subset R^{2^n(n+1)}$$

$$\vdots \qquad \vdots \qquad \vdots$$

$$\exists \delta^{r-n}(D^0) = \bigcup_{j=r}^{n-1}\left(\bigcup_{i_{j-r}=1}^{p_{n-r,j-r}} D_{i_{j-r}}^{n-j}\right) \cup \left(\bigcup_{k=0}^{r}\left(\bigcup_{i_n=1}^{p_{n-k,n-k}} D_{i_n}^{k-r}\right)\right) \subset R^{2r(n+1)}$$

$$\downarrow \delta^{-1}$$

$$\exists \delta^{2-n}(D^0) = \bigcup_{j=2}^{n-1}\left(\bigcup_{i_{j-2}=1}^{p_{n-2,j-2}} D_{i_{j-2}}^{n-j}\right) \cup \left(\bigcup_{k=0}^{2}\left(\bigcup_{i_n=1}^{p_{n-k,n-k}} D_{i_n}^{k-2}\right)\right) \subset R^{2(n+1)}$$

$$\downarrow \delta^{-1}$$

-continued $$\exists \delta^{1-n}(D^n) = \bigcup_{j=1}^{n-1}\left(\bigcup_{i_{j-1}=1}^{p_{n-1,j-1}} D_{i_{j-1}}^{n-j}\right) \cup \left(\bigcup_{k=0}^{1}\left(\bigcup_{i_n=1}^{p_{n-k,n-k}} D_{i_n}^{k-1}\right)\right) \subset R^{n+1}$$

$$\downarrow \delta^{-1}$$

$$\delta^{-n}(D^0) = \bigcup_{j=0}^{n-1}\left(\bigcup_{i,j=1}^{p_{n,j}} D_{i,j}^{n-j}\right) \cup \left(\bigcup_{i_n=1}^{p_{m,n}} D_{i_n}^{0}\right) \subset R^n$$

From the above-described centricity transformation, it becomes possible to perform reversible transformation as follows.

$$D^n \subset R^n$$

$$\delta_n(D^n)\downarrow \uparrow \delta_n^{-1}\left(\bigcup D^{n-1}\right)$$

$$\bigcup D^{n-1} \subset R^{n+1}$$

$$\delta_{n-1}\left(\bigcup D^{n-1}\right)\downarrow \uparrow \delta_{n-1}^{-1}\left(\bigcup D^{n-2}\right)$$

$$\bigcup D^{n-2} \subset R^{2(n+1)}$$

$$\delta_{n-2}\left(\bigcup D^{n-2}\right)\downarrow \uparrow \delta_{n-2}^{-1}\left(\bigcup D^{n-3}\right)$$

$$\vdots$$

$$\delta_2\left(\bigcup D^2\right)\downarrow \uparrow \delta_2^{-1}\left(\bigcup D^1\right)$$

$$\bigcup D^1 \subset R^{2^{n-1}(n+1)}$$

$$\delta_1\left(\bigcup D^1\right)\downarrow \uparrow \delta_1^{-1}\left(\bigcup D^0\right)$$

$$\bigcup D^0 \subset R^{2^n(n+1)}$$

In this manner, by taking the centricity set, objects in various modes can be grasped from a new aspect.

Further, by changing parameters of transformation into an integer, a real number, and the like, a result which is difficult to be obtained in data processing of an ordinary image can be obtained. As specific examples, as examples of data information, processes to reduce image information of an ellipse contained in a two-dimensional space and a two-dimensional area by replacing with a three-dimensional space and a one-dimensional area will be described later.

Hereinafter, best modes for carrying out the invention will be described with reference to the drawings.

Figure 3:
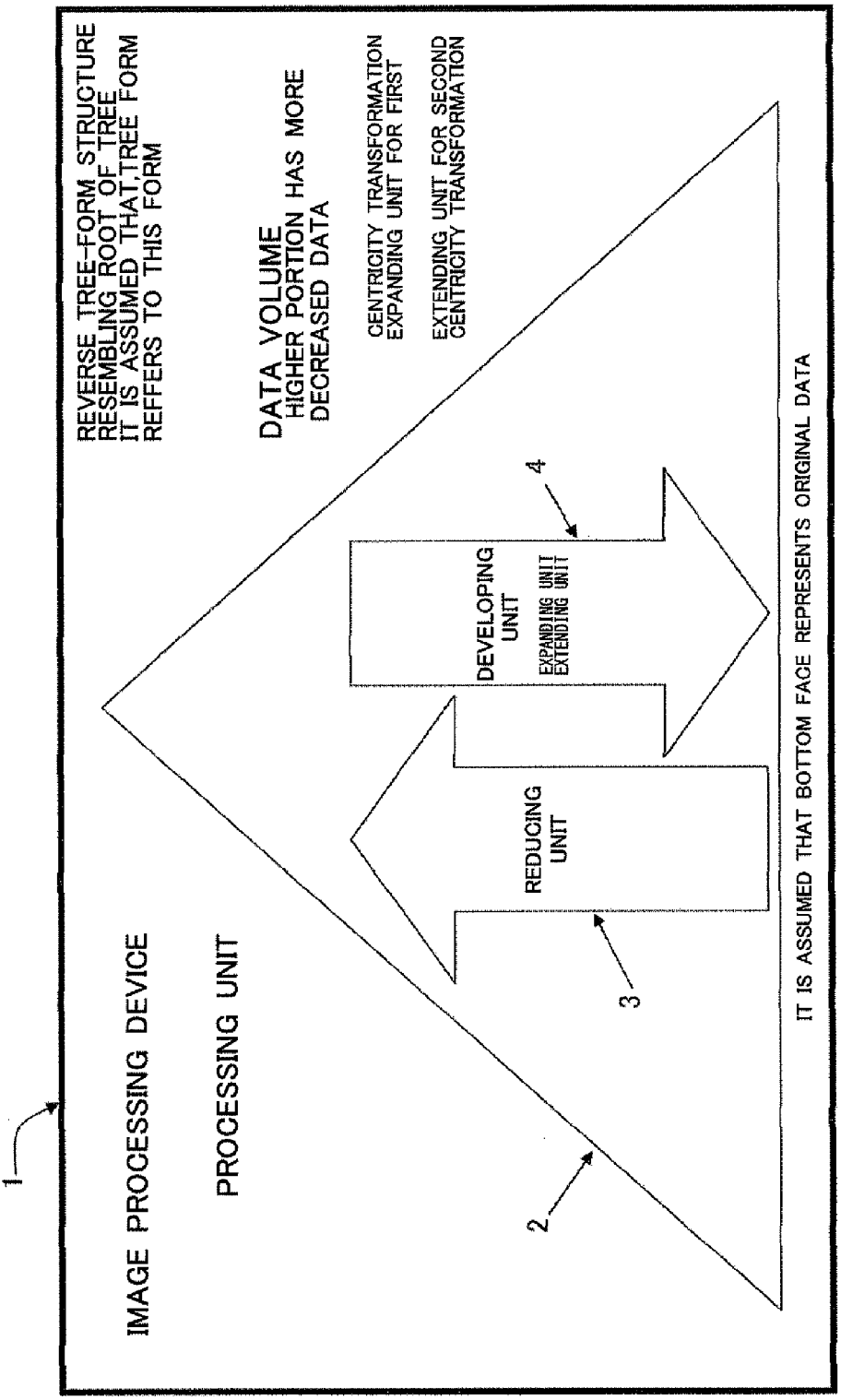
FIG. 3 is a schematic structural diagram of a processing unit including a data processing method in a data processing device of the present application.

FIG. 3 is a schematic structural diagram of a processing unit including a data processing method in a data processing device of the present invention.

An example of a device 1 for processing data of the present invention is illustrated in FIG. 3. The device 1 for processing data of the present invention internally has a processing unit 2 made up of a data volume reducing unit 3 reducing input data information or the data volume of image information taking an image as an example, and a developing unit 4 reconstructing the image information reduced in this data volume reducing unit 3. Note that in description of the method for processing of the present application, although the data volume reducing unit 3 and the developing unit 4 are illustrated separately for convenience, practically information is reduced and reconstructed in the input direction of the image information by processing in the processing unit 2.

Further, although not particularly limited, the device 1 for processing data of the present invention refers to, for example, a device capable of displaying a figure, painting (including a hand-written one), picture, or the like as a still image or moving image on a display of a personal computer, digital still camera, or the like for example.

There is routinely performed taking an actual image into a processing unit of a data processing device as image information and displaying the image on a display, or transmitting the image information from another data processing device taking in the image information via communication means such as the Internet, a recording medium such as USB (Universal Serial Bus) memory, or the like, and taking the image information into the processing unit of the data processing device and displaying an image on a display.

Here, when the image information of an image having a large amount of information as described above is taken into the processing unit of the data processing device, the data volume of the image information taken in as described above is decreased (reduced) in a data volume adjusting unit of the processing unit, and thereafter this reduced image information is reconstructed to display an image on the display, for reducing the processing time of the CPU, effective utilization of memory resource, and the like. The image information is processed by the known technique as described above.

Figure 4:
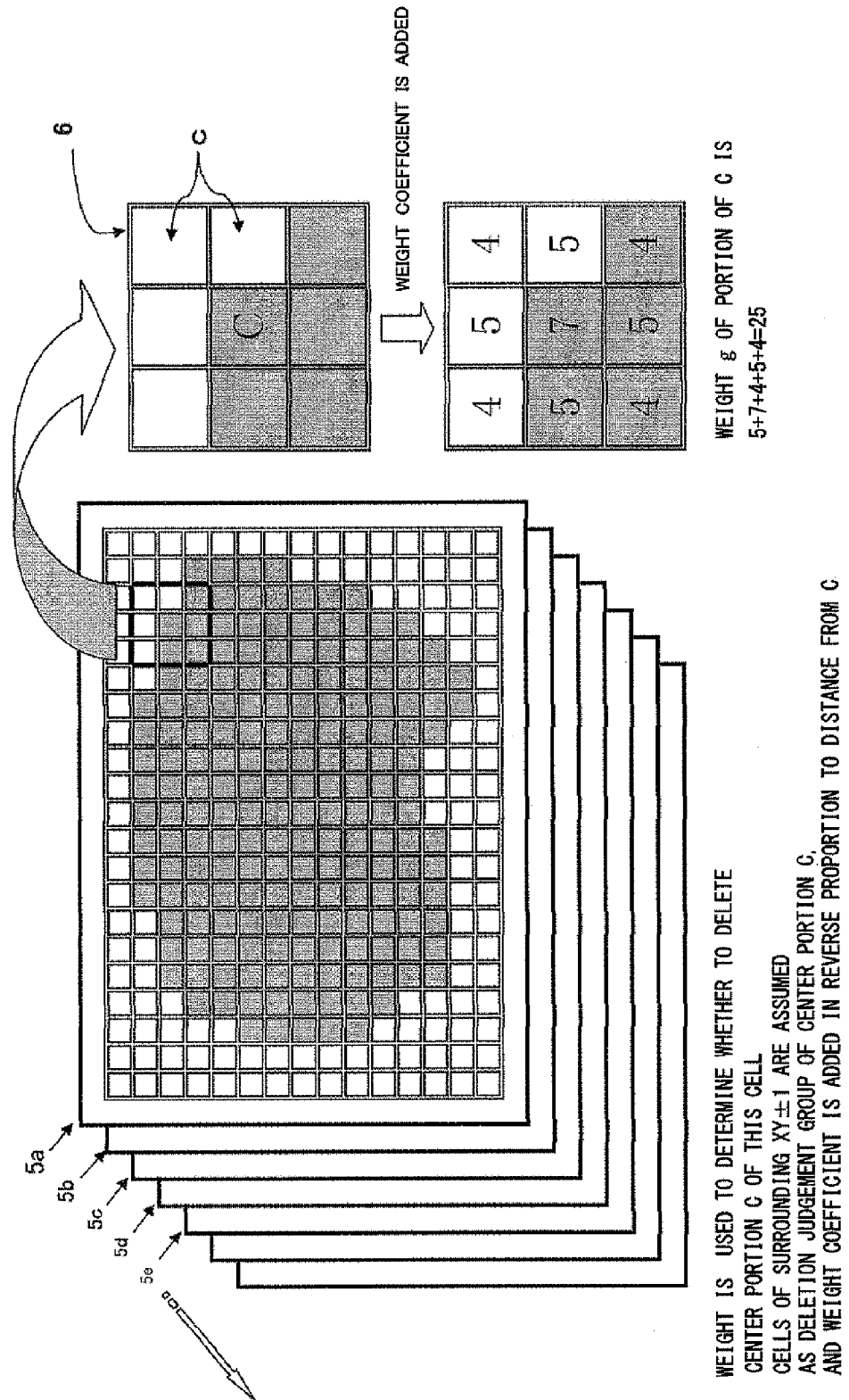
FIG. 4 is a schematic diagram of the processing unit, in which upper and lower layers (5*a*, 5*b*, . . . ) are overlaid in a reverse direction for easiness of viewing.
Figure 5:
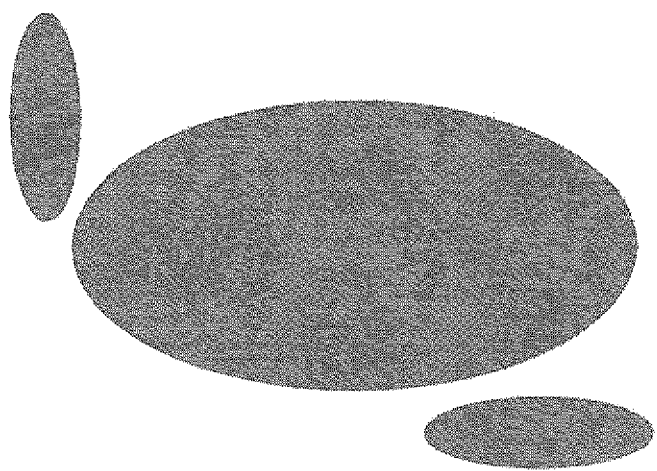
FIG. 5 is an original image illustrating ellipses as an example of performing data processing using the data processing method in the data processing device of the present application.
Figure 7:
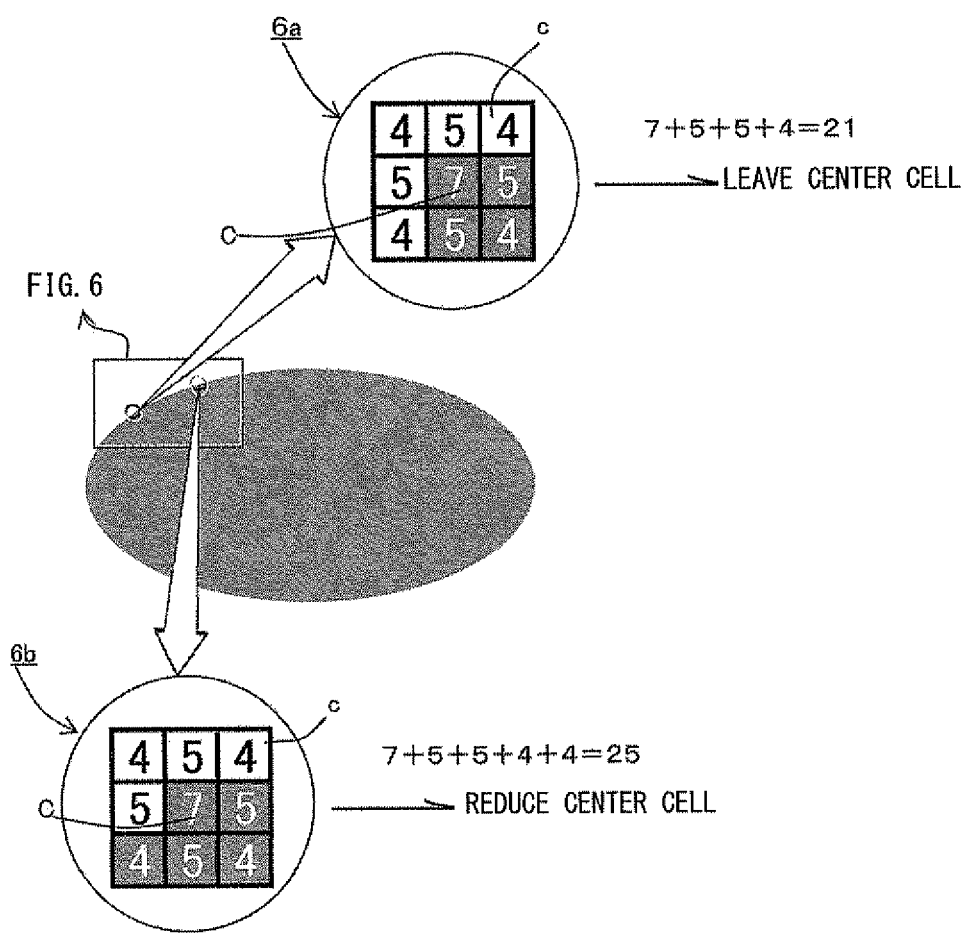
FIG. 7 is an enlarged diagram of groups of cells located in a part of ellipse image information.
Figure 9:
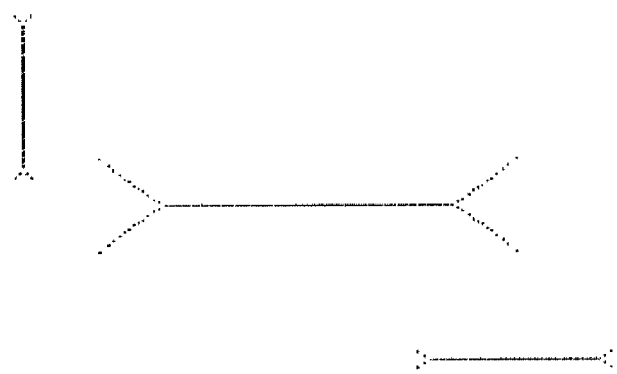
FIG. 9 is an image obtained by reducing the ellipse image illustrated in FIG. 5 by the data processing method in the data processing device according to the present application.
Figure 10:
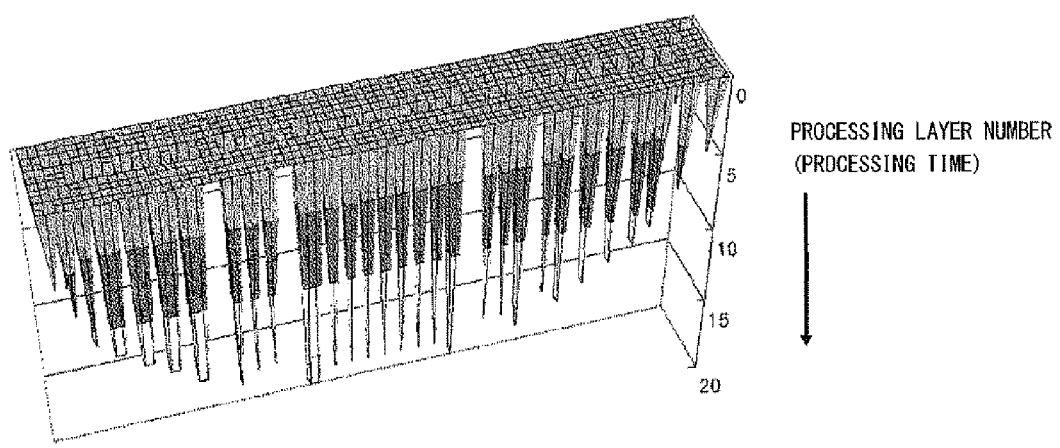
FIG. 10 is a perspective view of a processing space depicted with a vertically reversed processing direction.
Figure 11:
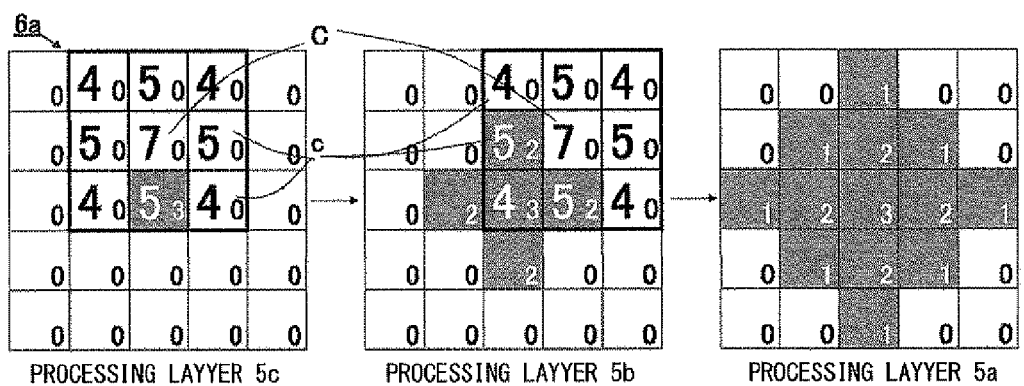
FIG. 11 is a process diagram of cell reconstruction performed for each processing layer of one group of cells.
Figure 12C:
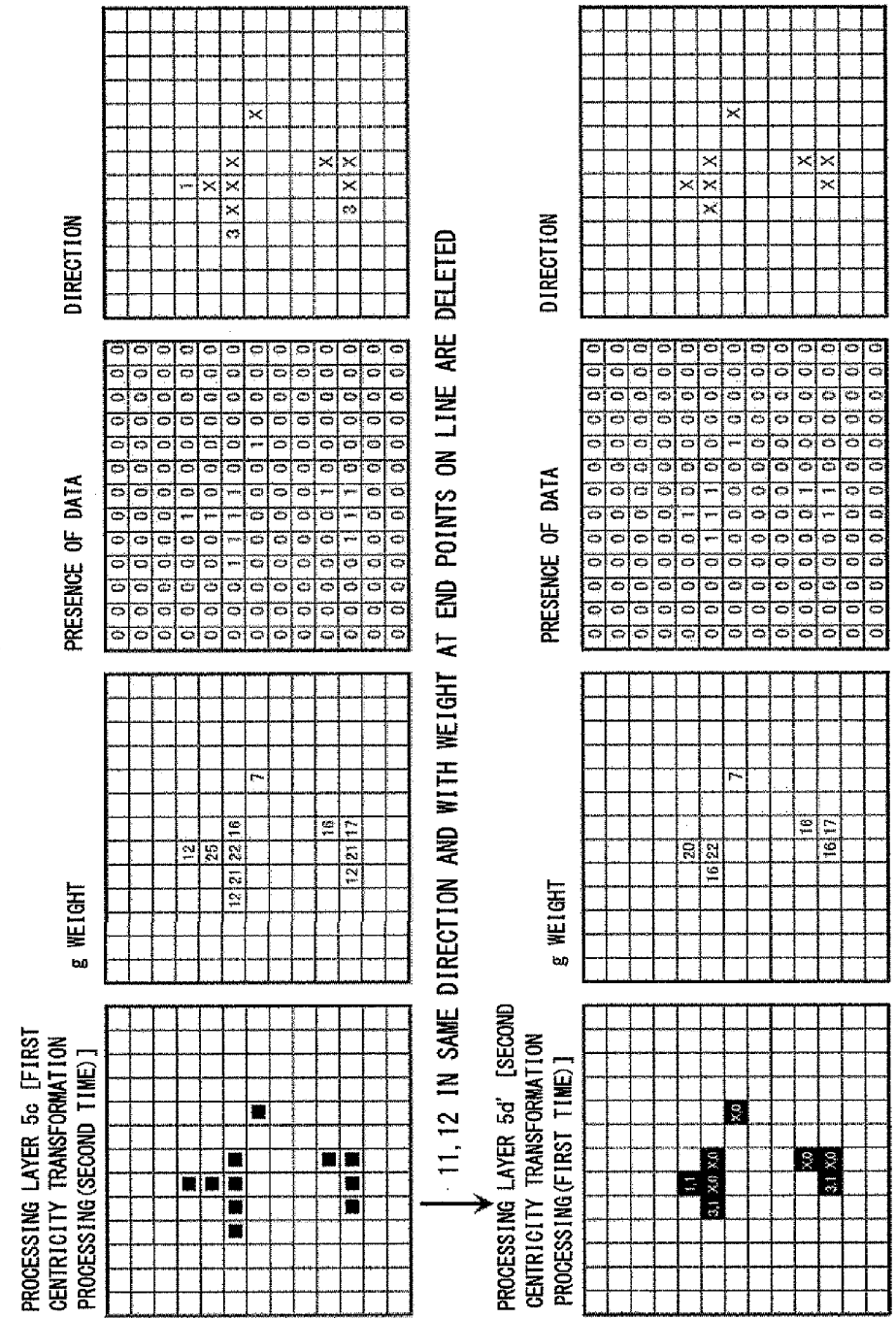

Now, a specific structure will be described with respect to the data processing method of data information and the data processing device, which are characteristics of the present application invention. FIG. 4 is a schematic diagram of the processing unit. FIG. 5 is an original image illustrating ellipses as an example of performing data processing using the data processing method in the data processing device of the present invention. FIG. 6 is an identification example of cells with respect to one group of cells and a process diagram of cell reduction performed for each processing layer. FIG. 7 is an enlarged diagram of groups of cells located in a part of ellipse image information. FIGS. 8A-8D are a reduction process diagram for groups of cells forming a part of ellipse image information. FIG. 9 is an image obtained by reducing the ellipse image illustrated in FIG. 5 by the data processing method in the data processing device according to the present invention. FIG. 10 is a perspective view of a processing space. FIG. 11 is a process diagram of cell reconstruction performed for each processing layer of one group of cells. FIGS. 12A-12C are a process diagram of second centricity transformation processing of groups of cells obtained by performing first centricity transformation processing on a part of the ellipse image information.

In the present application invention, there is provided a data processing method enabling reversible processing which is different from conventional ones by using the data volume reducing unit 3 and the developing unit 4 forming the processing unit 2 as a programmed processing circuit for data information of an image or the like, and there is provided a device 1 for processing data including the processing unit 2, which has the data volume reducing unit 3 and the developing unit 4, which reconstructs reduced data information.

This processing unit 2 is structured by overlaying plural processing layers 5 in a sheet form (for example, 128 layers in a depth direction of a screen, or the like), as illustrated in FIG. 4. Further, each of the processing layers 5 is formed of a plurality of cells c which are two-dimensionally laid (in vertical and horizontal directions or the like on the screen), and the arrangement of cells c is identical in all the processing layers 5. Therefore, the processing unit 2 can be in a three-dimensional processing mode (one-dimensional composite body) obtained by adding the overlaying direction of the processing layers 5 to a two-dimensional plane having cells c. In addition, in these cells c, it is assumed that adjacent cells c do not interfere with each other in the processing layers 5.

Next, in the processing layers 5, cells c are grouped into plural cell groups 6 formed of an arbitrary number of cells and arranged in advance. The number (n) of cells c forming the cell groups 6 is $n^2$ (n is an odd number except 1), in which an odd number of cells c are disposed in each of two dimensional directions to obtain a center cell C, which will be described later. In this application, for example, the plural cell groups 6 each formed of 9 cells c are disposed on each processing layer 5. These plural cell groups 6 become active over time accompanying start of processing of image information, and their operation is controlled corresponding to the status of surrounding information.

In addition, when it is performed in a discrete space, the center point cannot be obtained unless a continuous mass is always of an odd number. Accordingly, when a continuous mass of cells containing n columns of same data exists, it is necessary to newly create a cell space between cells, with the new cell space being in a state of having the same attribute as adjacent cells.

Further, the boundary portion is brought into an empty state.

[Equation 4]

: Empty Cell

: Cell that black color entered

: Cell that white color entered

When it is one dimentional,

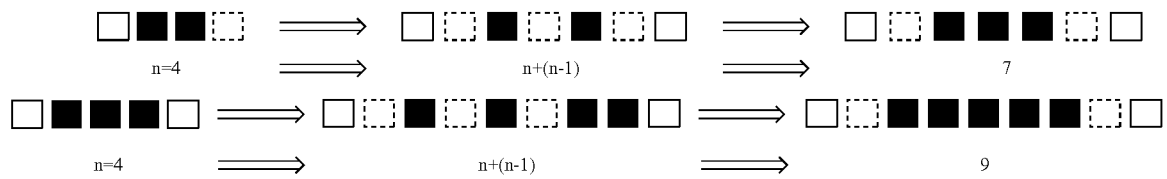

When it is two dimentional,

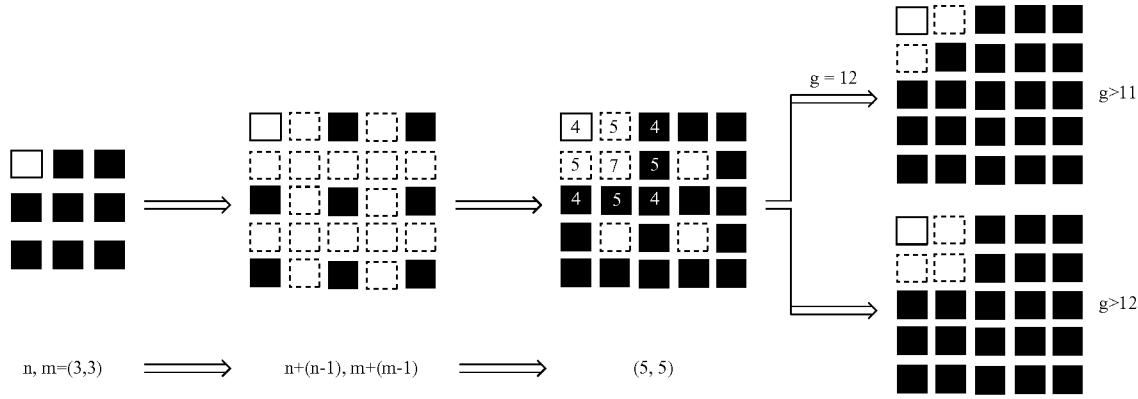

When reconstruction processing is performed later, processing inverse of the above-described processing needs to be performed.

Here, taking an image having an elliptic shape with a two-dimensional plane as an example, a method for processing an image of image information by the processing unit 2 will be described using drawings.

Ellipses of an original image like one illustrated in FIG. 5 are taken into the processing unit 2 as image information in an image processing device 1, such as a personal computer, by a scanner or the like as image information. At this time, the data volume reducing unit 3 starts reducing the data volume in the taken image information. First, respective cells c forming the processing layer 5a located at the lowest layer recognize respective positions corresponding to the original image of the ellipses, and image information of the ellipses is obtained as the entire processing layer 5a.

Next, the data volume reducing unit 3 first causes each of the cell groups 6 grouped in advance in the processing layer 5a to perform unit processing as first centricity transformation processing. Specifically, one cell group 6a formed of nine cells c is assumed as one unit. To each cell c adjacent to the center cell C located at the center in this cell group 6a, a numeric value corresponding to equivalence and distance of data from the center cell C is added as a weight of each cell c, so as to identify each cell c. That is, cells of surrounding XY±1 are assumed as a deletion judgment group of the center part C, and a weight coefficient is added in reverse proportion to the distance from C. This processing is defined as the first centricity transformation processing.

In the example of FIG. 6, among the nine respective cells c in the cell group 6a, the weight on the center cell C which is located in this cell group 6a and is the center of image information which this cell group 6a has is decided as 7, and thereafter, a numeric value such as 4 or 5 is added to the eight surrounding cells c in reverse proportion to equivalence and distance of data from the center cell C. Each of the cells c is identified thus by the weight.

For this identification of each cell c, the numeric value as described above is added as a weight, and the presence of reduction of the center cell C is determined. At this time, the nine cells c are grouped into four groups of E, F, G, and H and multiplied by the presence within a cell. Depending on the condition of E, H and F, G which are located diagonally, it is decided that the center cell portion C will not be deleted when E=H and F=G or will be deleted when E≠H or F≠G. Further, although the value is reduced once, when the surrounding values are congeneric and exist in the same layer and the result of weight addition is 20, 14, or the like, the hierarchy is increased by one and the values can be aggregated to the center.

Further, in the other cell groups in the processing layer 5a illustrated in FIGS. 8A-8D, calculation of weight of surrounding and identification of the cell C of each cell group 6 is performed similarly.

Next, regarding each of individual cells of the cell group 6a (and each of the other cell groups 6) in the processing layer 5a, the data volume reducing unit 3 reduces image information contained in a cell as the center cell C. At this time, when the image information is reduced, this cell C stores 0 of binary numbers (0: absent, 1: present) to indicate the absence of image information.

Next, the data volume reducing unit 3 moves the image information of the cell group 6a which includes the cells c having the image information (and each of the other cell groups 6) to the cells c of the corresponding cell group 6a (and each of the other cell groups 6) of the next processing layer 5b laid above the processing layer 5a.

Then, the data volume reducing unit 3 reduces the image information contained in the center cell C from the processing layer 5b toward 5c of the cell group 6a (and each of the other cell groups 6).

Therefore, in the example of the cell group 6a, it becomes a state that there is no image information in the surrounding cells c other than the center cell C in the third processing layer 5c of the processing layers 5, and thus the unit processing of this cell group 6a is finished in the processing layer 5c. In addition, when the surrounding cells c remain in another cell group 6, subsequently the data volume reducing unit 3 further moves this cell group 6 to a upper processing layer 6 (fourth layer, fifth layer, . . . ), and the unit processing to transmit and reduce information is performed by leaving the center cell C similarly to the above or by increasing the hierarchy thereof to the surrounding similar colors c.

Moreover, in addition to the above-described processing, the data volume reducing unit 3 performs processing to leave the center cell C of each cell group 6 in this cell group or reduce the center cell. This processing is such that, in the above-described cell group 6a, for example, among the nine cells c having a color difference, if differences in color of the surrounding cells c from the center cell C as a reference color are in a certain range, they are assumed as congeneric cells having the same color difference, and a weight is added thereto. Further, the weight for the other cells is set to 0. Then, when the added weight is in a certain range, reduction is performed. In other cases, the data volume reducing unit 3 leaves the center cell C of the cell group 6a in the cell group 6a in a processing layer 5c.

Specifically, as illustrated in the example of FIG. 7, in the weighted cell group 6a, the sum of weights of four congeneric cells c having the same color difference and including the center cell C becomes 21, and the sum of weights of the other cells c becomes 22. Thus, the ratio of the same color difference of the four cells c including the center cell C is less than half the color difference of the entire cell group 6a. Therefore, the data volume reducing unit 3 determines that different color differences are mixed in the cell group 6a in the processing layer 5c, and leaves the center cell C in the cell group 6a.

Further, differently from the above description, when five or more cells c including the center cell C among the nine cells c having a color difference in the other cell groups 6 are in the congeneric range of the same color difference with respect to the other four or less cells c, the data volume reducing unit 3 reduces the center cell C of the cell group 6 from this cell group 6 in a processing layer 5 higher than the processing layer 5 in which the center cell C is left.

Specifically, as the example illustrated in FIG. 7, in the weighted cell group 6b, the sum of weights of five cells c including the center cell C having the same color difference becomes 25, and the sum of weights of the other cells c becomes 18. Thus, the ratio of the same color difference of the five cells c including the center cell C is more than half the color difference of the entire cell group 6a. Therefore, the data volume reducing unit 3 determines that the cell group 6a has the same color difference, and reduces the center cell C from the cell group 6 in a processing layer 5 higher than the processing layer 5 in which the center cell C is left. Accordingly, the volume of entire image information can be reduced further.

In addition, the data volume reducing unit 3 may perform the processing to reduce or leave the center cell C according to the ratio of the congeneric range in the cell group 6 in the lowest processing layer 5a in the beginning of the unit processing.

Regarding the image information illustrated in the example of FIG. 6, in which the image of ellipses illustrated (partially illustrated) in FIG. 5 is recognized by the cells c laid across the processing layer 5 by performing the processing as described above, first, when the same color difference range (congeneric range) including the center cell C in each cell group 6 is equal to a set value (assuming that the weight sum is, for example, 22 to 34 as illustrated in FIG. 2), the center cell C of this cell group 6 is reduced so as to reduce image information contained in these center cells C, and position information can be passed on by increasing the hierarchy thereof by one to the surrounding cells c. As a result, as illustrated in a right diagram of FIGS. 8B-8D, image information formed of point groups of discrete cell groups 6 having the center cell C can be made, in which the data volume of the image is largely reduced. Note that the weight sum values of the respective cell groups and processing layers illustrated in FIGS. 8A-8D are presented as an example, and there may be various numeric values depending on images, positions of image information, and so on.

In the processing of the image information as described above, the unit processing of the cell groups 6 is performed in the order of the processing layers 5. Thus, the processing area of the present application is a three-dimensional space representing the processing layers 5 (the number of processing layers) extended upward (on the vertical axis) from the upper two-dimensional plane illustrated in FIGS. 8A-8D as a time axis (processing time). Further, seeing FIGS. 8A-8D from the front, when the respective center cells C of the cell groups 6 which remain in the processing layers 5 accompanying finish of the unit processing are coupled, it becomes a one-dimensional curve.

Therefore, as a result of processing the image information of the ellipse image of a two-dimensional plane as described above, an image with a reduced amount of information as illustrated in FIG. 9 is obtained. In this case, the image information of the reduced ellipse image can be represented by one-dimensional composite bodies each made up of point groups (plane, two-dimensional) along an elliptic shape on the two-dimensional plane representing the center cells C of the cell groups 6 obtained along the elliptic shape, and point groups (time axis, one-dimensional) of a straight line viewing the above-described first-order curve, which is located in the vicinity of the center of the point group of this elliptic shape and coupling the center cells C of the cell groups 6, which indicates the processing layer at the time of finish of the above-described unit processing as a processing time, in the direction from two-dimensional plane above.

Next, to reconstruct the image information which is reduced as described above into an original image inversely to the above description, first, from an upper one of the processing layers 5 in which a center cell C remains, with this center cell C being a base point, the developing unit 4 performs reconstruction processing in order toward a lower one of the processing layers 5 by diffusing data information.

As a specific example, regarding the cell group 6a, as illustrated in FIG. 11, with a center cell C left without being reduced (in this case, hierarchy is assumed as 3) in the processing layer 5b being the base point, the developing unit 4 ignites the center cell C (reconstruction processing operation), and thereby the cells which are located around this center cell C are reconstructed based on a hierarchy and a weight. Note that also in FIG. 11, the image information processed with tree-form all direction type illustrated in FIG. 2 is illustrated.

In addition, as described above, in other cell groups 6 in which the center cell C is reduced, the developing unit 4 ignites cells, in the processing layer 5b in which reconstruction toward a surrounding part is performed with the center cell C being the center, from a layer with a large hierarchy number to a layer with a small hierarchy number in order similarly to the above description, to thereby reconstruct the cells based on the hierarchy and weight.

Next, the developing unit 4 reconstructs cells having the hierarchy number 1 covering the entire boundary of the range of reconstruction in the processing layer 5a.

Figure 8B:
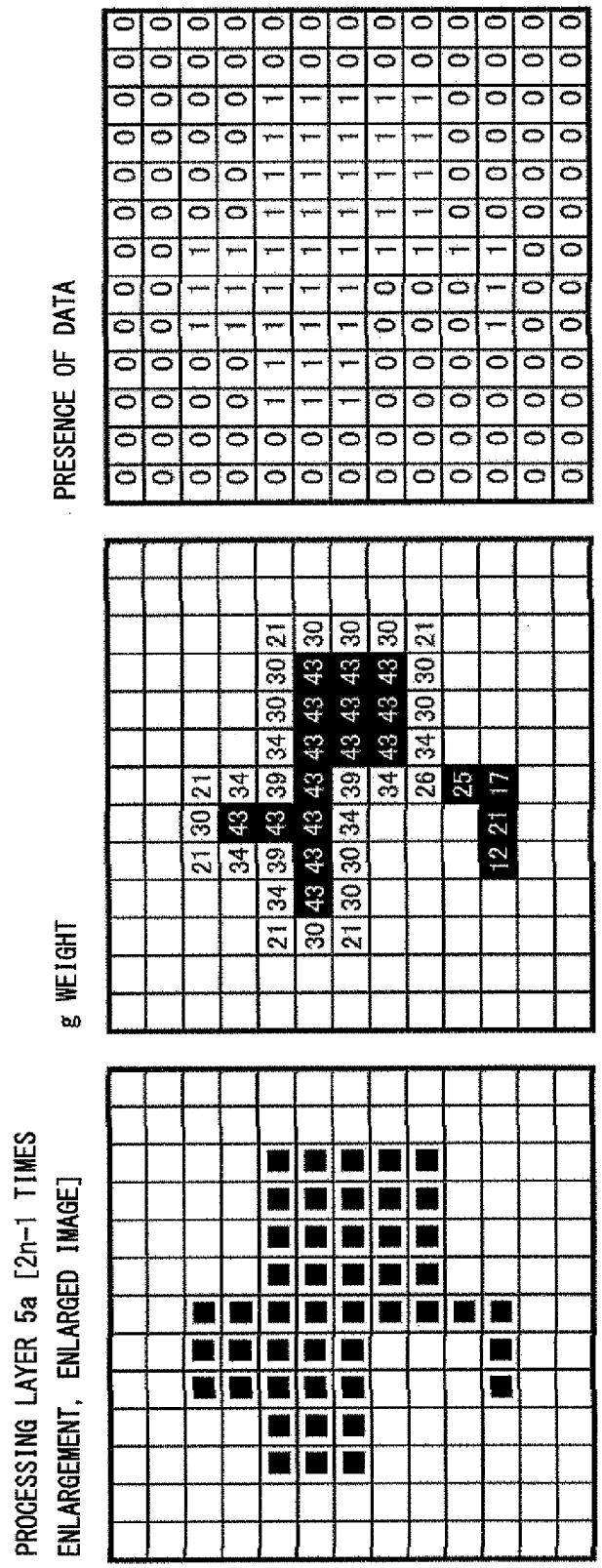
Figure 8C:
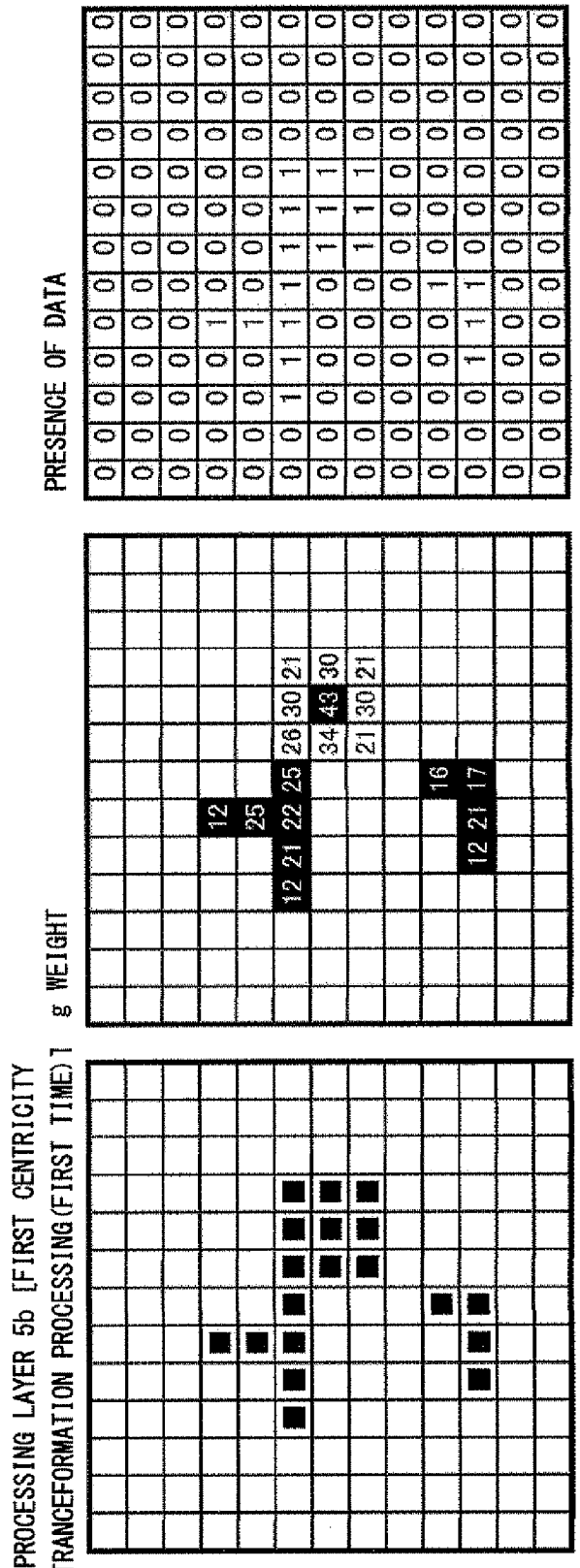

By such reconstruction processing, the image information which has been reduced as illustrated in the right diagram of FIGS. 8B-8D illustrating a part of the ellipse is reconstructed to image information as illustrated in a left diagram of FIGS. 8B-8D. As a result, the image information reduced to the point groups of center cells C illustrated in FIG. 9 taking the ellipse image as an example can be reconstructed to the image information of the original ellipses illustrated in FIG. 5 with good reproducibility.

Note that these one-dimensional composite bodies obtained by reduction can be likened to branches of a tree with no leaf. When image information is reconstructed, it can be likened to a state that a tree is grown thick with leaves attached to these branches. Thus, the method for processing an image of the present application is referred to as a method for processing an image which enables reversible processing in a tree form.

Further, regarding a weight g, data in the range of lower limit L and upper limit U such that the value of g satisfies the following expression L≤g≤U are deleted. Alternatively, data are not deleted when the value of g satisfies the following expression 0≤g<L or U<g≤Max (maximum value). Here, L and U are variables and need to be changed according to the purpose of processing. When data of cells in center parts are not present, the weight g is also 0. The data type at the time the reconstruction processing is performed changes when the pattern of deletion is in a state as illustrated in FIG. 2.

Further, when center cells are deleted in the range of weight g satisfying the following expression 26≤g≤39, reconstruction becomes possible with a weight equal to or larger than 4 by tree-form all direction type of FIG. 2. In this case, branch parts extending in a direction with the gradient $1/\sqrt{2}$ of an absolute value in the direction of time axis and in directions of 45°, 135°, 225°, and 315° on the screen can be reduced, and the unit (original) of the radius r described in the part of [Equation 1] is $\sqrt{2}$. Although the compression rate is slightly low, conversion into signals is easy, and this type can be used mainly for circuit processing or the like.

Moreover, when center cells are deleted in the range of weight g satisfying the following expression 22≤g≤34, reconstruction becomes possible with a weight equal to or larger than 5 by tree-form oblique direction type of FIG. 2. In this case, branch parts extending in a direction with the gradient 1 in the direction of time axis and in directions of 0°, 90°, 180°, and 270° on the screen can be reduced, and the unit (original) of the radius r described in the part of [Equation 1] is 1. The compression rate is as high as around 90%, and this type can be used mainly for image processing or the like.

In addition, when the range of the weighted sum g of each cell is changed as illustrated in FIG. 2 and center cells C are deleted with the range of g being 26 to 39 for example, many center cells C remain compared to the processing in the tree form, and thus the shape in the processing layer after image information is processed becomes like a complicated tree form. This form can be used in a circuit, and has a nature that it is strong to the data deficit and can be recovered even if part of the data is broken.

By the processing of image information as described above, the image information can be reduced largely as point groups of center cells C. Further, in the present application, the image information can be reduced further by second centricity transformation processing using the centricity concept which couples and corrects center cells C obtained through reduction by the above-described first centricity transformation processing, converts data in dotted line to straight line, and deletes center cells C located at end points of straight line.

In this case, the image information, which is obtained by reducing the image information through the first centricity transformation processing as described with the processing layer 5c of FIGS. 8A-8D for example, is used to illustrate a specific example with FIGS. 12A-12C. Note that the cell groups 6 are located at the same enlarged positions.

Next, to couple on a straight line to enable the two-dimensional centricity processing, regarding enlarged cell groups 6 including a center cell C as in FIG. 12A which are discrete in each processing layer 5 (in this example, the processing layer 5c), the data volume reducing unit 3 makes a determination in a closer area in an upper processing layer 5 (in this example, a processing layer 5d) as illustrated in FIG. 12A for example, and inserts surrounding values in cell positions 6' having a weight of 8 or 10 among the cell groups 6.

Then, in the processing layer 5d, each cell group having data can be coupled on straight lines, and respective cell groups 6, 6' which are end points of these straight lines (in this case, cell groups 6 with a weight of 11 or 12 or at portions of nodes, which are not a straight line) are reduced as illustrated in FIG. 12B. Further, in this case, cell groups 6 which are located at respective centers of the discrete cell groups 6, have a weight 17 or 15, and are straight are located in the vicinity of the center of image information and thus are not reduced.

At this time, the cell groups 6, 6' which remain without being reduced together with the reduced cell groups 6 record a reduction status (reduction direction and so on) as numeric values and the like. Further, numeric values added to the cell group 6, which remains as in the right diagram, indicate the direction and the size of the frame of a cell group as an example of the reduction condition. That is, surrounding cells of XY±2 are designated as a deletion judgment group of center parts C, and a weight coefficient is added in reverse proportion to the distance from C. This is defined as the second centricity transformation processing. Further, when the processing speed is given priority or when the data amount after processing may be small as in FIG. 12C, the second centricity transformation processing is performed without performing enlargement. Then, when the second centricity transformation processing is performed, there may be a situation that end points and branch points are deleted and a situation that only end points are deleted. Furthermore, when the second centricity transformation is performed and point groups with the same direction and amount are aligned, all the groups can be organized and aggregated to one point.

By the second centricity transformation processing of image information as described above, further from the data volume (number of cell groups 6) of the point group of only cell groups 6 including a center cell C by the first centricity transformation processing as illustrated in FIG. 12A, the data volume (number of cell groups 6) of image information illustrating a part of the ellipse image of the left diagram of FIGS. 8B-8D becomes the data volume (number of cell groups 6) as illustrated in FIG. 12B, and thus the image data volume can be reduced largely.

Further, when the image information having the cell groups 6, 6' reduced by the second centricity transformation processing as described above is reconstructed to the image information base (left diagram of FIGS. 12A-12C) of the first centricity transformation processing, with the cell groups 6, 6' remaining in the processing layer 5 (in this case, the processing layer 5d) being a base point, the developing unit 4 ignites these cell groups 6, 6', so as to reconstruct the reduced cell groups 6 with good reproducibility based on the record of reduction status of the deleted cell groups 6 and the remaining cell groups 6, 6'. In addition, regarding the above-described processing layers, a separately placed processing layer which is not used in the first centricity transformation processing may be used to perform the second centricity transformation processing.

Figure 19A:
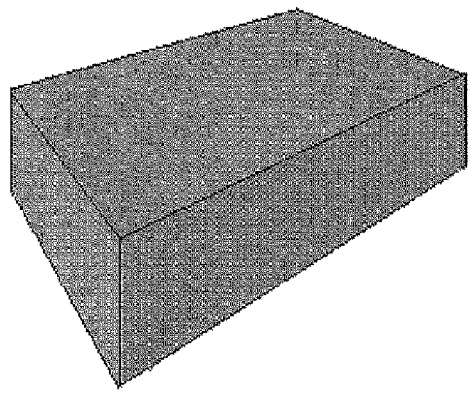
FIGS. 19A-19D are a diagram illustrating processes of centricity transformation processing up to the third on a box having a three-dimensional area as an example of image information.
Figure 19B:
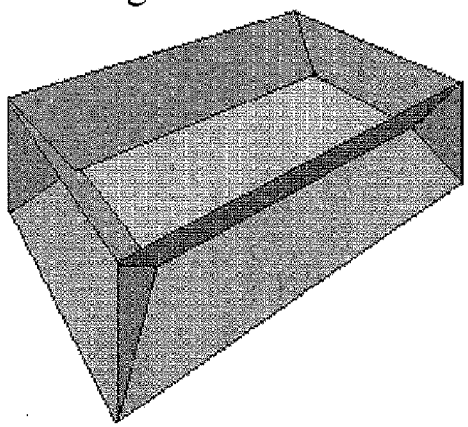
Figure 19C:
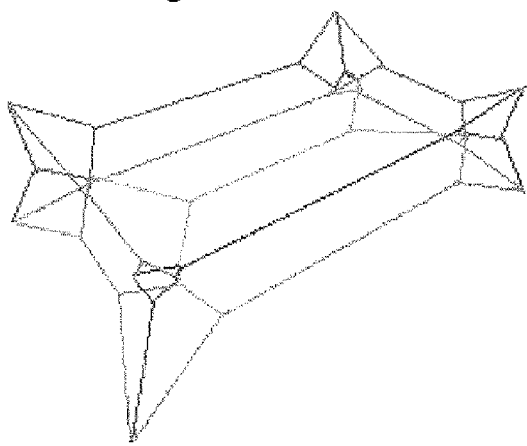
Figure 19D:
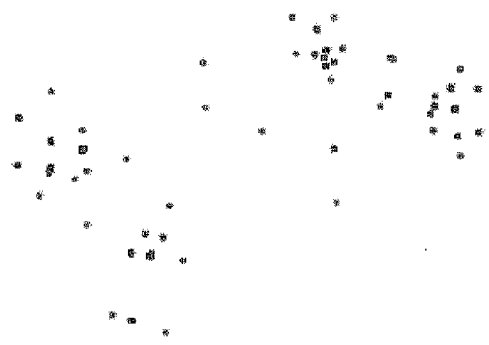

Regarding the second centricity transformation processing of image information, when an image to be processed in the image processing method which enables reversible processing in a point-tree form of the present application has a three-dimensional area of a box or the like and is a straight object as illustrated in FIG. 19A for example, the first centricity transformation results in a two-dimensional composite body (in a state like a portion in which bubbles adhere to each other) as illustrated in FIG. 19B. Next, the second centricity transformation is performed to reduce flat portions, thereby transforming the body into lines illustrated in FIG. 19C. In this case, there is created an eight-dimensional space with two time dimensions and six space dimensions. Here, the axis direction may be the same direction as the previous time axis (direction perpendicular to the processing layer). Further, third centricity transformation is performed, center cells are coupled in an arbitrary direction in processing layers located above and below to assume them as a straight line in the processing space, and cells located on end points of this straight line are reduced. As a result, the cells become points in a 16-dimensional space illustrated in FIG. 19D.

A table is presented below as a reference example for comparing an image data volume reduced by the image processing method by the point-tree form of the present application invention with image data volumes compressed in PNG format and JPEG format as other representative compression formats with respect to the same image.

TABLE 1

|  | Point-tree form | PNG | JPEG | Original image (BMP) |
| --- | --- | --- | --- | --- |
| Image A (hand written) | 728 | 917 | 4852 | 60054 |
| Image B (geometric figure) | 754 | 1159 | 6467 | 180054 |

Unit: Byte

It is assumed that the tree form includes up to the second centricity transformation processing.

It is assumed that the image A is a relatively simple drawing (monochrome) created arbitrary by hand writing.

It is assumed that the image B is a geometric figure (monochrome) created by a personal computer or the like.

As indicated by the above table, it can be seen that the reduction ratio of image data volume is better with the tree form of the present application invention than the conventional compression formats. Although the target images are limited to the above table and comparison with various images is not made because the present application invention is still in the middle of study, large reduction of a data volume with various images can be expected.

By the structure as described above, image information in units of cell groups can be subjected to the unit processing of serial type in the order of processing layers similarly to in-brain processing, and the congeneric ratio in each cell group can be determined to reduce center cells. Thus, the image information can be reduced quickly and efficiently. Further, with the center cell of each cell group being a base point, cells which have been reduced can be securely and quickly reconstructed in the order of closeness to this center cell. Accordingly, reproducibility of image is high, and it is possible to provide a data processing method and a data processing device which achieve a high reduction rate of image data volume and high reproducibility of image.

Figure 13:
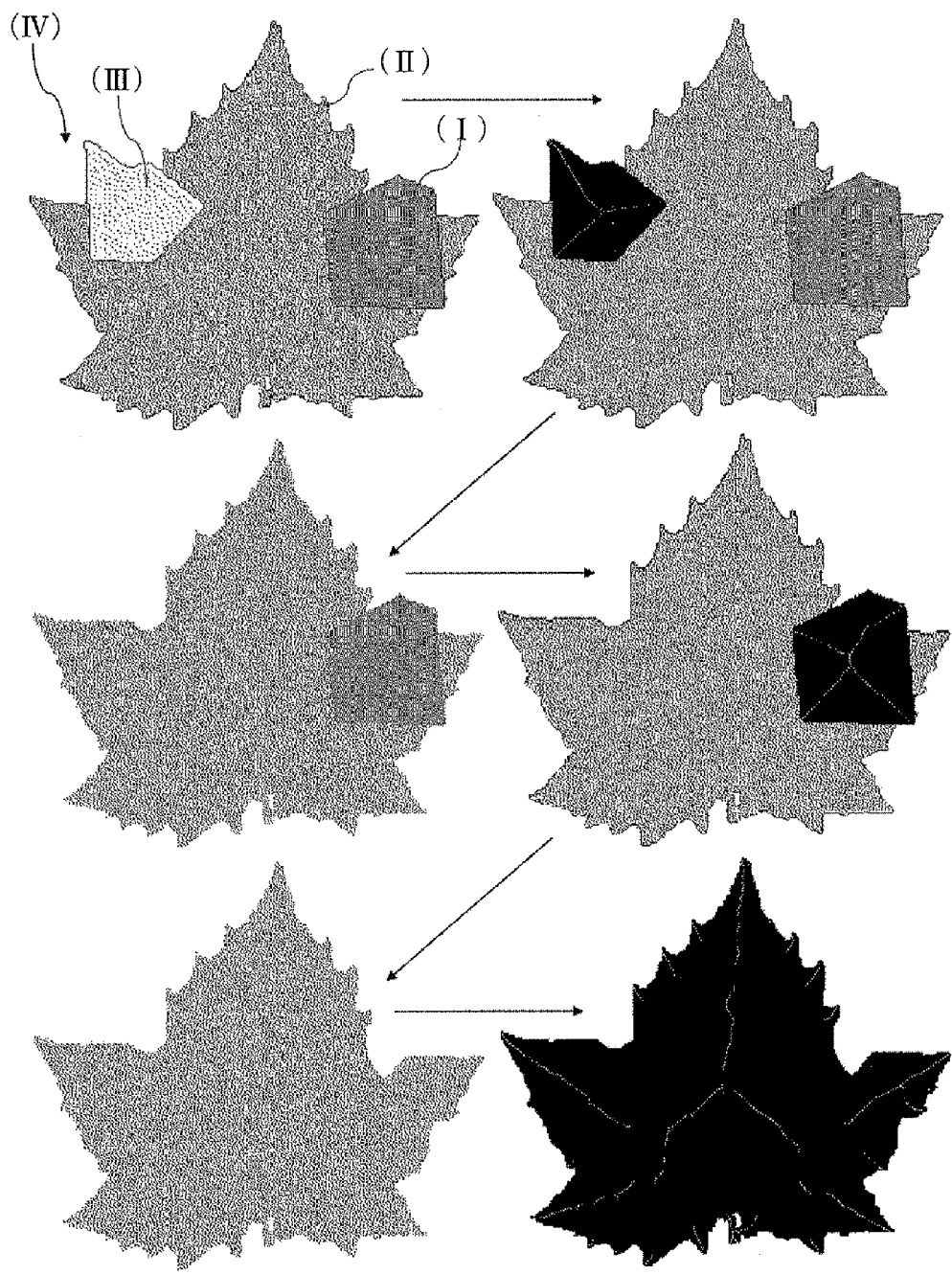
FIG. 13 is an example of an original image describing reduction of data volume for each of similar colors.
Figure 21A:
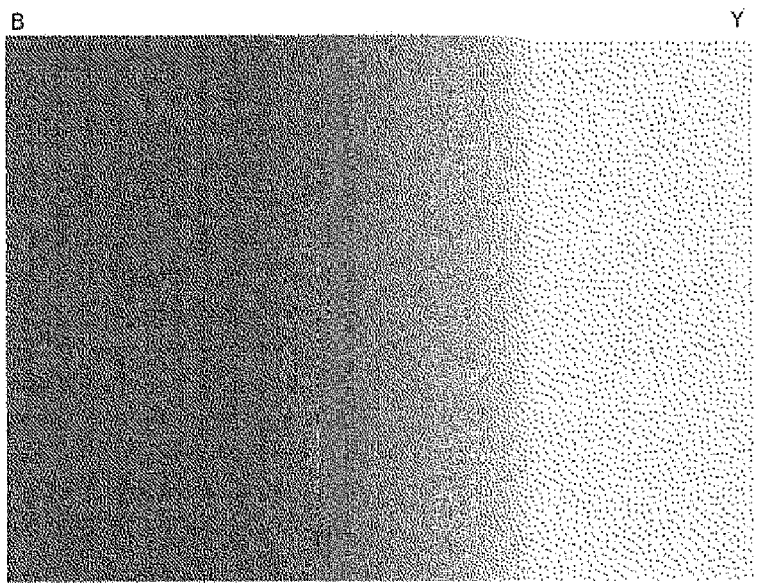
FIGS. 21A-21B are a diagram illustrating an example of processing when a threshold is provided.
Figure 21B:
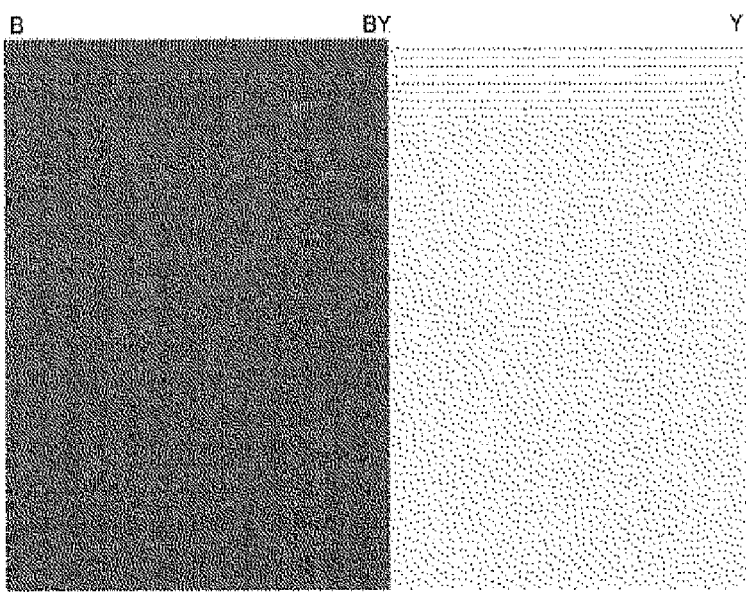

Further, by using a data processing method which will be described below, the data volume can be reduced further. FIG. 13 is an example of an original image describing reduction of data volume for each of similar colors. FIGS. 14A-14E are a process diagram of reduction of cells performing point-transformation of data information in an image with a similar color. FIGS. 15A-15D are an explanatory diagram of a data volume reducing unit which repeats reduction and expansion. FIG. 16 is a table illustrating one example in which image data of FIG. 13 are reduced to be discrete data. FIG. 17 is a table illustrating an example of analyzing data of FIG. 16 in a z-axis direction. FIG. 18 is a table illustrating an example of analyzing data of FIG. 16 in reverse order of the z-axis direction. FIGS. 19A-19D are a diagram illustrating processes of centricity transformation processing up to the third on a box having a three-dimensional area as an example of image information. FIGS. 20A-20D are a graph illustrating signals performing reading and writing of a tree-form data structure. FIGS. 21A-21B are a diagram illustrating an example of processing when a threshold is provided.

Here, for example, data on a cell when data information is reduced in a two-dimensional plane in a two-dimensional space are reduced as follows. First, as illustrated in FIG. 13, image information is an image (IV) formed of an image (I) having a closed area of greens for example as similar colors such as having gradations, and an image (II) having a closed area of reds for example and an image (III) having a closed area of yellows for example as similar colors such as having gradations, which are superposed on the image (I). Areas (continuities of data information) thereof are larger in ascending order of the image (I), the image (II), and the image (III).

First, the processing unit 2 recognizes that the image information is a set of different colors and areas having respective areas formed of similar colors (green [image (I)], red [image (II)], and yellow [image (III)]). Then, in the image information, the data volume reducing unit 3 first reduces the data volume of the image (III) of similar yellows having a smallest area (low continuity of data information). In addition, the image (I), the image (II), and the image (III) are data information present on plural cells c which are two-dimensionally laid on the processing layer 5, as described above.

Figure 14A:
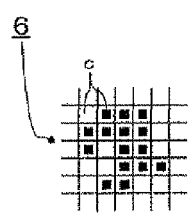
FIGS. 14A-14E are a process diagram of reduction of cells performing point-transformation of data information in an image with a similar color.
Figure 14B:
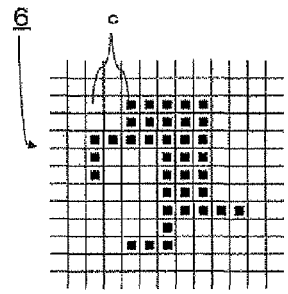

Like the example of cells c having black squares in the diagram of FIGS. 14A and 14B, even number and odd number pieces of data information of the image (II) are lined up in a row N direction and a column M direction. To obtain center points thereof, all information pieces are extended to be odd lines. The data volume reducing unit 3 performs enlargement transformation of a processing space of cells c illustrated in FIG. 14A from N×M to (N+(N−1))×(M+(M−1)) as illustrated in FIG. 14B. Here, the middle one of FIG. 13 is an enlarged image in which a gap of one pixel can be seen between the images (I) and (II). This is due to that a closed area whose colors are all similar became the same odd number. Further, no value exists in an open part.

Figure 14C:
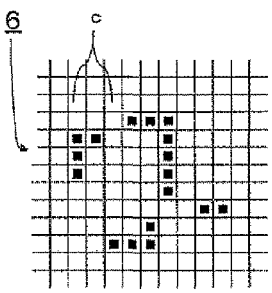

Next, like above-described FIGS. 6-7, in each of plural overlaid processing layers 5, the data volume reducing unit 3 reduces data information of surrounding cells c and center cells C until there is completely no data to delete, according to the number of data of the surrounding cells c with reference to the center cell C of each cell group 6a as described above, thereby reducing the data volume of the image (III) as illustrated in FIG. 14C for example.

Then, tree-formed data information of the image (III) reduced to this FIG. 14C is moved to plural processing layers 5' overlaid similarly to the above ones, provided separately for each image by color. As illustrated in the middle of FIG. 13, surrounding colors (green of the image (I), and so on) are expanded in empty spaces to fill the spaces generated in the image (III).

Figure 15A:
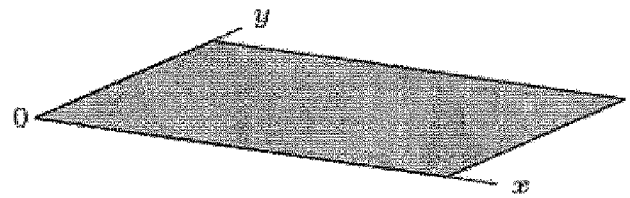
FIGS. 15A-15D are an explanatory diagram of a data volume reducing unit which repeats reduction and expansion.
Figure 15B:
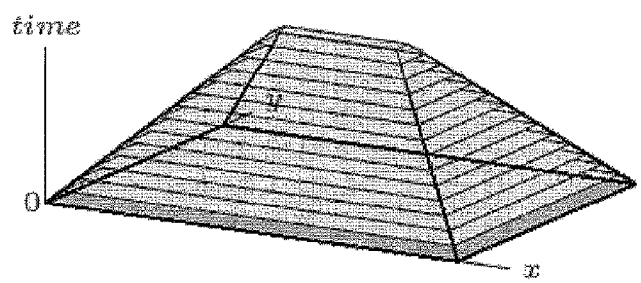
Figure 15C:
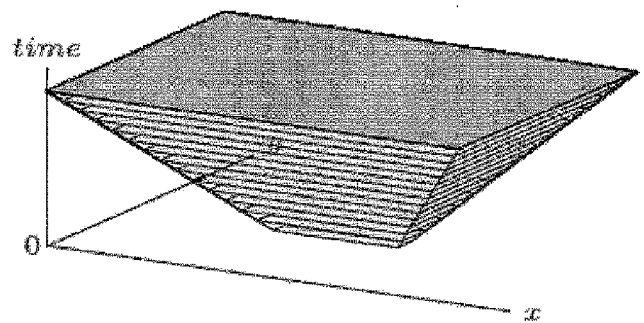
Figure 15D:
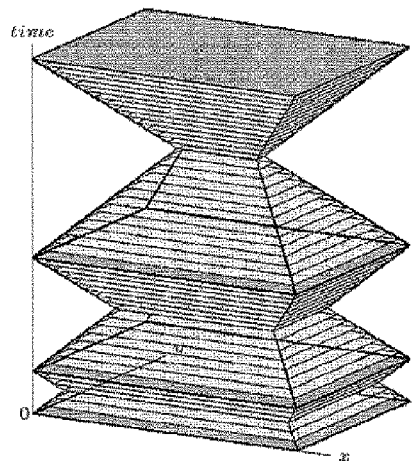

At this time, assuming that the image of (IV) of FIG. 13 exists on the screen of FIG. 15A similarly to the above description, the data volume reducing unit 3 sequentially reduces the data volumes of the image (II) and image (I) having a small contrast color occupying area, and moves the respective data information to the respective processing layers 5. The series of processing and the structure of the data volume reducing unit 3 are achieved by repeating (b) reduction and (c) expansion as illustrated in FIG. 15D. At a lower narrow portion of FIGS. 15A-15D, the image (III) is moved to another layer. The image (II) is moved to another layer at a middle narrow portion, and the tree-formed data information of the image (I) is moved to another layer at the topmost narrow portion. Finally, the top surface indicates a state that only white remains which is the background.

Figure 14D:
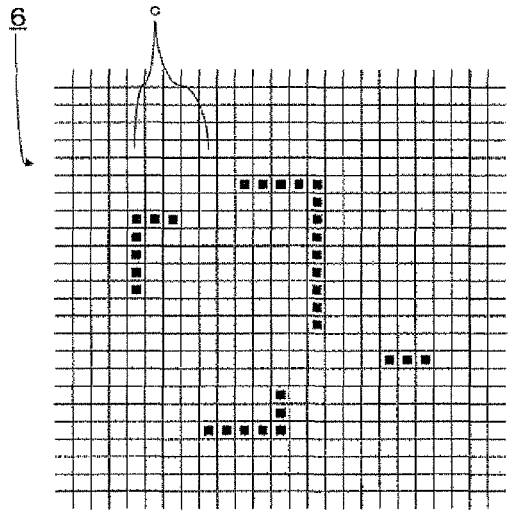

Next, when cell groups c having data information in the image (III) of the processing layer 5' has an even column as in FIG. 14C for example, in order to obtain a center point, the data volume reducing unit 3 extends the processing space to $(2(2N-1)\times(2(2M-1)-1)\times(2r-1)$ as in FIG. 14D for example with r being the number of processing hierarchies so that these cell groups c having data information becomes an odd column.

Figure 14E:
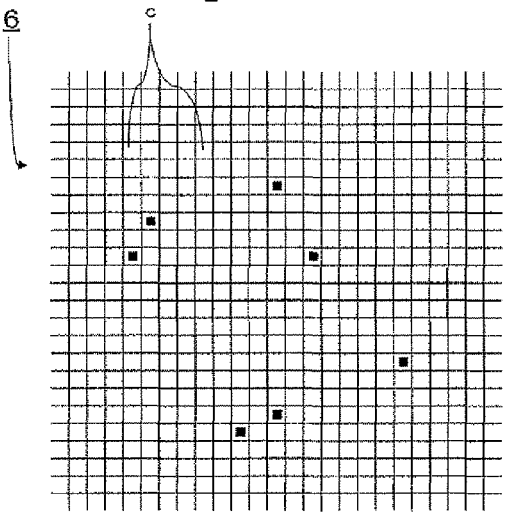

The data volume reducing unit 3 then repeats reduction of cells c located at end points of a straight portion of sequential cell columns c having data information, as in above-described FIGS. 12A-12C in each layer of the processing layers 5', thereby reducing the data volume of the image C to point groups illustrated in FIG. 14E. Therefore, the data volume reducing unit 3 is able to further reduce the data volume of images C, B, and A by performing processing similar to the above-described one in order on the other images B, A in the processing layers 5'. In addition, by observing the last processing of FIG. 13, it can be seen that a tree form is formed. Then, in the thus formed tree form, a fine part and a large part are separated. The tree form which is formed first is information of the fine part, and the tree form which is formed later is information of the large part. These data are separated later respectively for comparing whether they are the same values, and characteristics thereof are recorded in a record analyze control unit in order to perform data processing.

A table is presented below as a reference example for comparing the data volume reduced as described above as the point-tree form (similar color) with image data volumes compressed by the normal tree form as well as PNG format and JPEG format in the same image as the image (IV) described above.

TABLE 2

| | Point-tree form | Tree form | PNG | JPEG | Original image BMP |
|---|---|---|---|---|---|
| Image (IV) | 1349 | 1584 | 1540 | 5480 | 111654 |

Unit: Byte

As indicated by the above table, the tree form and PNG exhibit almost the same value of reduction ratio of image data volume. However, the result of the processing method using the point-tree form (similar color) is higher than the processing method by the tree form and PNG, thereby indicating that the processing method is more excellent.

In the foregoing, reduction of data information by the tree form of the present application invention has been described with examples of image data. However, the data information can be transformed into a tree-form structure also for sound data such as voice and music, so as to largely reduce the data volume thereof.

In this case, in the tree-form structure of sound data, the size of a tree form changes depending on the amplitude and the wavelength of sound. Sound can be decomposed into a frequency and amplitude, and thus the larger the amplitude, the larger the lateral width of the tree form. The branching position of a branch is decided by the ratio of each frequency. Therefore, it becomes possible to easily recognize human voice.

Further, a method to use a resonance instrument having a triangular pyramid structure used for a megaphone or the like to simultaneously capture vibration of sound by frequency and amplitude, or the like is also conceivable. Sound with a long wavelength extends longer in a vertical direction orthogonal to a layer, and sound with a short wavelength extends short in a vertical direction. Further, it is assumed that one with more sound amplitude extends in a lateral direction which is parallel to a layer. The sound is represented with at least a frequency and amplitude and processing thereof is in a two-dimensional space, and thus the sound can always be transformed into one-dimensional data according to the centricity set theory. A tree-form data are formed by a distribution of frequencies.

The tree form of sound data or the like is different in structure from the tree form of image processing. Specifically, the tree form of image data has a broadleaf tree structure, whereas the tree form of sound data or the like has a conifer structure, and there is a difference in whether a layered structure is allowed or not on the same type of information.

That is, the layered structure is not allowed for the same color with respect to image data, but conversely, the layered structure is allowed for certain sound with respect to sound data. This causes the form of data to change between the broadleaf structure and the conifer structure. Further, by repeatedly hearing similar sound, this conifer structure grows to spread horizontally on a layer.

To read and write these tree form data structures, as illustrated in FIG. 20A, a pulse signal or a normal distribution signal is used. When signals have equal energy, even when an input is the normal distribution signal which is not the pulse signal, an output signal can be converted into the pulse signal by a method which will be described below.

However, in this method, sound or the like has reversibility, but when two or more dimensional data of image data or the like are processed, it is possible that an image is reconstructed as a mirror image. Thus, it is not exactly reversible transformation unless information of surrounding data is not added.

However, even when there is a difference in direction and size of the tree form, it is easily recognizable. Therefore, recognition of an object or the like can be performed easily by a processed tree form structure.

For reading out, pulses are sent to the inside of a circuit having the tree form structure from the base portion of each tree form, and a part of the pulse signal is returned to the base portion as the source depending on the degree of the angle of a branch. High signal intensity is sent to a direction with high straightness, and the pulse signal is branched at a node portion so that one becomes smaller as its bending angle becomes larger.

Further, at the end portion, the pulse is reflected entirely and all pulse signals are returned to the base portion as the source. Therefore, as illustrated in FIG. 20B, for wavelengths of normal distribution type, it becomes short by the ratio of $(\pi-\theta)/\pi$ with respect to the branch angle.

As illustrated in FIG. 20C, when a branch is made, proceeding straight with a wavelength (σ diverse value) of 0 degree is assumed as onefold, and the 45-degree angle is assumed as ¾, 90-degree angle as ½, 135-degree angle as ¼, and 180-degree angle as 0 for considering a reflected wave.

[Equation 5]

Assuming that the distribution ratio of signal energy is $\beta(0\leq\beta\leq1)$, a signal with input signal energy $S_{in}$ is considered.

$$S_{re\ ReflectionSignal} + S_{pass\ PassedSignal} = S_{in\ InputSignal}\beta_{re} + \beta_{pass} = 1$$

Thus, when the total signal is 1, $$\sin^2\left(\frac{\theta}{2}\right) + \cos^2\left(\frac{\theta}{2}\right) = 1$$

When n number of branches exist, the ratio of each branch varies with angle, and from FIG. 20C, $$\sigma_i^2 = ((\pi - \theta_i)/\pi)^2$$

$$\sum_{i=1}^{n} \sigma_i^2 = \sum_{i=1}^{n} \left(\frac{\pi - \theta_i}{\pi}\right)^2$$

$$\sum_{i=1}^{n} \sigma_i^2 \sin^2\left(\frac{\theta_i}{2}\right) + \sum_{i=1}^{n} \sigma_i^2 \cos^2\left(\frac{\theta_i}{2}\right) = \sum_{i=1}^{n} \sigma_i^2$$

$$\frac{\sum_{i=1}^{n}\left(\sigma_i^2 \sin^2\left(\frac{\theta_i}{2}\right)\right) + \sum_{i=1}^{n}\left(\sigma_i^2 \cos^2\left(\frac{\theta_i}{2}\right)\right)}{\sum_{i=1}^{n} \sigma_i^2} = 1$$

Accordingly, the ratio $\beta_{re}$ of the total reflection signal is $$\beta_{re} = \frac{\sum_{i=1}^{n} \sigma_i^2 \sin^2\left(\frac{\theta_i}{2}\right)}{\sum_{i=1}^{n} \sigma_i^2}$$

Therefore, the total reflection signal energy is $S_{re} = S_{in} \beta_{re}$.

The ratio $\beta_{pass}$ of the total passed signal is $$\beta_{pass} = \frac{\sum_{i=1}^{n}\left(\sigma_i^2 \cos^2\left(\frac{\theta_i}{2}\right)\right)}{\sum_{i=1}^{n} \sigma_i^2}$$

Therefore, the total passed signal energy is $S_{pass} = S_{in} \beta_{pass}$.

The ratio $\beta_{pass\,\theta_i}$ passing in a $\theta_i$ direction is $$\beta_{pass\theta_i} = \frac{\sigma_i^2 \cos^2\left(\frac{\theta_i}{2}\right)}{\sum_{i=1}^{n} \sigma_i^2}$$

The energy amount $S_{pass\,\theta_i}$ is $S_{pass\,\theta_i} = S_{in} \beta_{pass\,\theta_i}$.

For example, as illustrated in FIG. 20D, considering that a pulse signal having amplitude of 1 branch into two, and angles are θ and φ, the respective ratios of dividing energy amounts are one being $\theta=0$, $\sin^2(0\pi/2)=0$, $\cos^2(0\pi/2)=1$, $\sigma_\theta^2=1^2=1$ in a straight direction, and one being a 45-degree angle $\phi=(\pi/4)$, $\sin^2(\pi/8)=0.1464\ldots$, $\cos^2(\pi/8)=0.8535\ldots$, $\sigma_\phi^2=(3/4)^2=9/16$, and thus $\sigma^2 = \sigma_\theta^2 + \sigma_\phi^2 = 1 + 9/16 = 25/16$.

The ratio of all reflection signals corresponding to this is $0.0527\ldots$, the ratio of all passing signals is $0.9472\ldots$, and therefore, signals are returned with approximate ratios such that a straight signal $\beta_{pass\theta}$ is 0.64, a signal $\beta_{pass\phi}$ branching with 45 degrees is 0.307, and a reflection signal $\beta_{re}$ is 0.052.

For the reflection wave, the wavelength is assumed as 0 and it becomes a δ function, but re-standardization is performed to make a pulse waveform. Then, the pulse becomes a sequence (waveform) of certain pulses, which can be read out.

Further, becoming pulses makes them easier to be processed. In calculation of the waveform of ordinary normal distribution type, processing of a variance, integration, and so on is difficult. However, for pulses, the input value is simply assumed as 1 and divided according to the ratio, and thus calculation processing can be performed easily.

This becomes the same value for the tree-form data structure having a similar shape and a different size. Further, the ratio of a signal interval $2a:2(a+c):2(a+b)=A:B:C$ gives similar results. Therefore, when amplitude value of the signal is the same and the signal interval ratio is the same, it is determined as the data in the same form.

Further, a concept called shape entropy contrived by the patent applicant for identification with a numeric value is introduced, and means for identifying a shape with a numeric value by the amount of the shape entropy will be described.

When a barycenter is defined as "a center point where weights are exactly balanced in parallel given that the weights are added to a certain unit space which does not overlap," and a distance $x_i$ is "a number obtained by adding up a minimum distance ∂x to which it is possible to travel with a minimum unit time ∂t by time T," the shape entropy can be said as "a number obtained by adding up a distance $x_i^2$ from the barycenter when an equivalent weight is added to a non-overlapping amount $\delta_i$ spreading across a space."

Here, the concept called shape entropy is introduced, and means for identifying a shape with a numeric value by the amount of the shape entropy will be described. When a barycenter is defined as "a center point where weights are exactly balanced in parallel given that the weights are added to a certain unit space which does not overlap," and a distance $x_i$ is "a number obtained by adding up a minimum distance ∂x to which it is possible to travel with a minimum unit time ∂t by time T," the shape entropy can be said as "a number obtained by adding up a distance $x_i^2$ from the barycenter when an equivalent weight is added to a non-overlapping amount $\delta_i$ spreading across a space."

$$x_i = \sum_{j=1}^{T} \frac{\partial x_j}{\partial t} \quad \text{discrete (integer) space}$$

$$x_i = \int v \, dt \quad \text{continuous (real) space}$$

Generally, the following relation exists between probability density p and distance x from a barycenter (center) from a normal distribution.

$$p(x) = \frac{1}{\sqrt{2\pi}} \exp\left(-\frac{x^2}{2}\right)$$

$$\frac{dp}{dx} = \frac{-x}{\sqrt{2\pi}} \exp\left(-\frac{x^2}{2}\right)$$

-continued $$\frac{1}{p} = \sqrt{2\pi} \exp\left(\frac{x^2}{2}\right)$$

$$\int \frac{1}{p} dp = \sqrt{2\pi} \int \exp\frac{x^2}{2} \frac{dp}{dx} dx =$$

$$\sqrt{2\pi} \int \exp\left(\frac{x^2}{2}\right)\left(-\frac{x}{\sqrt{2\pi}} \exp\left(-\frac{x^2}{2}\right)\right) dx = -\int x dx$$

$$0 \le p \therefore |p| = p$$

$$\log|p| = \log p = -\frac{1}{2}x^2$$

$$-\log p = \frac{1}{2}x^2$$

The higher the position of probability density, the smaller the distance from the barycenter. Therefore, as the shape entropy, $$H(X) = -\int p(x)\log(p(x))dx$$

Accordingly, $$H(X) = -\int p(x)\log(p(x))dx = \frac{1}{2}\int x^2 p(x) dx$$

When probability density $\delta_i$ is 0,1 in a discrete system, $$H(X) = \frac{1}{2}\sum x_i^2 \delta_i$$

Given that a fine unit is $\hbar$, a unique shape value G(X) is as the following equation.

$$G(X) = \frac{H(x)}{\hbar^2}$$

The shape entropy and the unique shape value can be obtained thus, and it becomes possible to identify the shape of an object by this unique shape value.

Figure 22B:
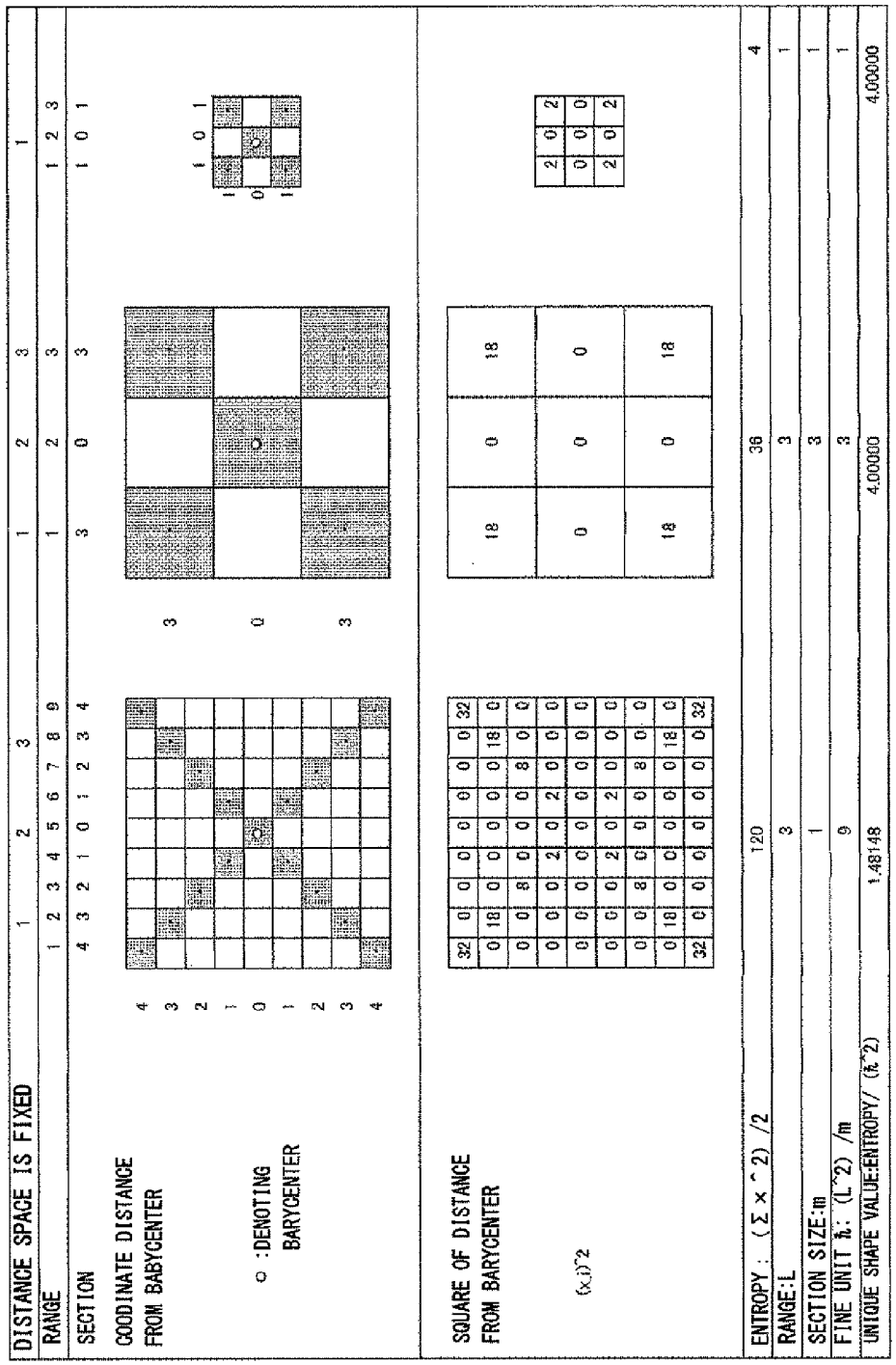
Figure 23A:

As in FIG. 22, FIG. 23, and so on, the shape entropy and the unique shape value can be obtained thus, and it becomes possible to identify the shape of an object by this value.

Further, when the tree-form data structure is written, the system directly processes image, sound, and logic data, or an input signal sequence having a waveform structure which is temporally reverse to an output signal sequence is sent from the tree-form base portion. When a signal with one pulse and amplitude of 1 is returned to the base portion as the origin, it is recognized that writing is completed.

Conversely, to create the tree-formed data structure from a pulse signal sequence having 1 for totaled amplitude value of signal, a temporally reverse pulse signal waveform is input to a layer to which no data is input, and a traveling direction and a length can be made according to signals of pulses.

Therefore, information from a certain control system is input as a normal distribution waveform having a certain waveform, and one coinciding with the data in the tree-form data is looked for. When there is no coinciding one, the wavelength of the waveform is shortened, and whether there is a coinciding one or not is checked again. This is performed repeatedly, and when it is not present finally, the waveform is changed to a Y-shaped tree-form data structure per unit and recorded separately.

When the circuit is made to react conversely, it becomes possible to transform a certain pulse into a sine wave having a certain amplitude and wavelength, and processing of a control system becomes possible.

Further, as internal processing to perform control, the inside of the processing system is data-masked first, and a signal path is created, in which it is possible to input and process data. Inside the circuit, a color (data) which reached an empty space first is granted the right of possession, and ones that finally become stable in a parallel state can become result data.

In addition, when these tree form transformation processing are performed, only data of similar colors can be processed. Therefore, for gradations which change gradually such as a sky in a picture like FIG. 21A, the following threshold processing is performed. A value of color data is defined as A, a certain threshold $\alpha$ is provided, and colors in the range thereof as A−$\alpha$<A<A+$\alpha$ are all regarded as similar (colors) and processed.

When reconstruction is performed, the image can be reconstructed with the similar color data values as in FIG. 21B. Then, a boundary portion (discrete state, jaggy) is generated between cells, resulting in a state that different data values are adjacent to each other. When this happens, a diffused point group (tree form) or a point (tree-form point) having a directivity is assumed as the origin, a minute value $\tau$ is considered, and a sequentially recognized value by color is defined as $\gamma$≡$\alpha$+$\tau$. Then, when a condition A−$\gamma$≤A≤A+$\gamma$ is met, average values of each other's value are obtained, a signal is reflected, and smoothing processing is performed while an intermediate value is made close to the value of the origin by passing through the same route inversely using the same time as an arrival time from the origin, thereby reconstructing substantially the original data of the gradations of FIG. 21A.

Next, as a method of storing and transmitting data in a recording media, the total data volume D of s dimension is defined as follows.

$$i, j, k, L_i, M_{ij}, C_{ijk} \in \mathbb{N} \qquad \text{[Equation 6]}$$

$$D = \prod_{i=1}^{s} L_i = \prod_{i=1}^{s} \sum_{j=1}^{n} M_{ij} = \prod_{i=1}^{s} \sum_{j=1}^{n} \sum_{k=1}^{m} C_{ijk}$$

$L_i$: total amount of cells in i-dimension, m: the number of data per cell (3 for RGB).
The volume of data per cell is
m=3, 0≤$C_{ijk}$≤255, 0≤$M_{ij}$≤$256^3$−1

$$M_{ij} = \prod_{k=1}^{m} C_{ijk}$$

The number of cells of all dimensions: n=$\prod_{i=1}^{s} L_i$, the maximum data length of i-dimension: $L_i$=$\sum_{j=i}^{n} M_{ij}$.

Normally, the screen of a personal computer is represented by Xmax×Ymax×COLORmax, and a screen with 600 horizontal pixels and 400 vertical pixels has 24-bit color information (($2^8$)$^3$ RGB data with Red: 256 gradations, Green: 256 gradations, Blue: 256 gradations) in one pixel (dot) on the screen. Then, when one pixel (dot) is assumed as one cell, the total data volume per screen is 600*400*$2^{24}$. This data volume is equal to the volume of a BMP file.

Further, another time axis is assumed as a reaction time t (root time). Here, it is conceivable that a data volume increases simply as the dimension increases, but the processing result would have a decreased data volume unless it is under a situation such that data are not continuous and highly discrete, randomness is at the maximum, and the size does not change when it is compressed.

For sequential data, a root value increases, values of N, M decrease, and the data volume is decreased entirely. The simpler the image is, the more the axis of t (root time) extends and the data volume decreases. The more complicated the image is, the less the axis of t (root time) extends and the data volume decreases.

When data are saved, the data volume always exists even if there is nothing on coordinates. Accordingly, to record discrete data, the number of data becomes much larger than an actually existing value. By using this method, a portion where there is no data can always become one bit. Moreover, the data volume decreases further by performing compression.

Hereinafter, a method for reversibly transforming the point-tree form and storing the result in a file will be described.

In a method for recording discrete information in an n-dimensional integer space as illustrated in FIG. 16 in a file, regarding data information reduced by the tree form or the point-tree form (similar colors), there are stored vertical and horizontal sizes of the data information, the number of maximum processing hierarchies, distances between maximum point groups (data), presence of screen data, and so on by two bits (1, 0) in a file or the like. The order of storing them is such that the number of colors and palette data are stored first in descending order of areas, and then presence of color is stored by two bits in the order of colors only regarding a portion having screen data which is stored previously. Further, regarding a portion having a color, each of fixed length data and variable length data are stored similarly to the order of colors.

Whether it is present or not (1, 0) on a two-dimensional plane which is a projection of certain discrete data on an n dimension is recorded by one bit. However, at this time, it is desired that the recording be performed in a direction in which the number of data contained becomes the minimum value. The direction of projection is tentatively called a Z direction (in this processing system, it is called a root time or widening volume).

As illustrated in FIG. 17, how many data overlap in the Z direction in a portion having data on the two-dimensional plane is measured. However, all the data always become a value of 1 or more, and thus 1 is subtracted in view of data reduction. Further, the number of stored bits is determined from the maximum number thereof, and the number of stored bits and the frequency of overlapping are recorded.

For example, when data are concentrated in an upper layer portion, data are processed layer by layer in order from the upper layer to a lower layer as illustrated in FIG. 18 (when data are concentrated in a lower layer portion, the processing starts from the lower layer portion [in this case, 1 bit is needed as a direction]). That is, the compression ratio becomes higher as the processing is performed in a part where the number of data is large in the earlier stage of the processing, and thus it is possible to perform the processing in the X direction and the Y direction depending on the condition of distribution of data.

In addition, when there is no data on the Z axis in the lower layer direction from the currently processed layer, data processing in this layer is skipped and the next data processing is performed. If there exist data in the lower layer direction, values of data are stored as 0 when there is no data in the current layer or 1 when there is data, the number of stored bits is determined thereafter from the maximum value of data, and 1 bit of a presence graph of data within layer and a data value graph are recorded.

However, all the data values always become a value of 1 or more, and thus 1 is subtracted in view of data reduction. In the layers, an end is called when all the data seen in the lower layer direction on the Z axis are 0 or when the processing of the lowest layer is finished.

In this manner, by performing similar storage processing by stacking respective data of positions, directions, and distances of reduced data information sequentially in a block shape, the reduced data information are stored efficiently in the aforementioned file or the like.

Further, when an image like one in FIG. 13 is reduced in the above-described point-tree form (similar colors), and data information stored in the aforementioned file or the like is reconstructed (reverse transformation or decompression), the data information of dimension number and the range of coordinates are read from the file and an output space is reproduced. Next, presence of data on the two-dimensional plane is read and reconstruction is performed.

Further, the overlapping frequency data of respective colors are read, and color data are moved in order one by one to the inside of the respective processing layers 5' and added to locations having data on the two-dimensional plane (since 1 is subtracted when data are stored, adding as they are makes them return to the original value).

Then, in order from the upper layer portion, the graph of presence of data within the layer is checked in a portion where the value of the overlapping frequency data is not 0. When there are data, the data are written from the data value graph in this layer, and 1 is subtracted from the overlapping time data. This is performed repeatedly for every color data, and the processing is performed down to the lowest layer. When the developing unit 4 develops the point group data similar to FIG. 14E in a direction-wise and volume-wise manner as illustrated in FIG. 14D in the processing layer 5', and overlays the data from the lower portion at last, the processing is finished. The procedure in this manner reverse to the procedure of the reduction processing enables reconstruction to the image in FIG. 13 with good reproducibility.

In the foregoing, reduction of data information by using the tree form of the present application invention has been described with examples of image data. However, as the data information, also sound data of voice, music, or the like and logic and control are transformed into the tree form structure, and thereby the data volume thereof can be reduced largely.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A data processing method reversibly processing data information input to a data processing device by a processing unit comprising:
   a data volume reducing unit reducing a data volume of the data information; and
   a developing unit reconstructing data information reduced in the data volume reducing unit, wherein:
   the processing unit is structured by overlaying processing layers formed of a plurality of cells;

the data volume reducing unit performs unit processing on each of the plurality of cells having the data information; and the unit processing performs identification processing by a weight according to equivalence and distance of data from a cell group adjacent to the cells, reduces the cells by each of the processing layers in an order from a lower layer to an upper layer of the processing layers until a data position existing on a time axis of the cells stops to thereby reduces the data volume, and processes the data in a record analyze control unit.

2. The data processing method according to claim 1, wherein
the method sets a cell which needs to determine whether or not a reduction of the cells is performed as a center cell, and sets a plurality of cell groups existing around the center cell as a group, in which the group is made by simplifying and unifying an operation of a neuron synapse and enables parallel processing by combining the cells.

3. The data processing method according to claim 1, wherein
the data volume reducing unit further reduces the center cell located at end points of a straight line coupling the center cell being remained in the processing layers to be perpendicular to the processing layers.

4. The data processing method according to claim 1, wherein
the cells record a reduction status of the data information.

5. The data processing method according to claim 1, wherein
the data volume reducing unit reduces the data information of n dimension in n-dimensional space to data information of (n−1)-dimensional composite body in (n+1)-dimensional space.

6. The data processing method according to claim 1, wherein
the data volume reducing unit reduces the data information of (n−1) dimension in (n+1)-dimensional space to 0-dimensional (point form) data information on $2^{n-1}(n+1)$ dimension.

7. The data processing method according to claim 1, wherein
the identification processing is weighting processing of assigning and adding a weight.

8. The data processing method according to claim 1, wherein
the developing unit reconstructs the cells being reduced in order from the upper layer to the lower layer of the processing layers.

9. The data processing method according to claim 1, wherein
the processing unit reduces and develops the data information for each similar data.

10. The data processing method according to claim 1, wherein
the record analyze control unit includes a method transforming a tree-formed data structure into a pulse signal and a method inputting/outputting and controlling data to retrieve, record, and construct a tree-formed structure from the pulse signal, in which the record analyze control unit controls a flow of other data by performing data masking on a circuit.

11. The data processing method according to claim 1, wherein
the data information is an image, a sound, logic, and control.

12. A data processing device reversibly processing data information input to a data processing device by a processing unit comprising:
a data volume reducing unit reducing a data volume of the data information; and
a developing unit reconstructing data information reduced in the data volume reducing unit, wherein:
the processing unit is structured by overlaying processing layers formed of a plurality of cells;
the data volume reducing unit performs unit processing on each of the plurality of cells having the data information; and
the unit processing performs identification processing by a weight according to equivalence and distance of data from a cell group adjacent to the cells, reduces the cells by each of the processing layers in an order from a lower layer to an upper layer of the processing layers until a data position existing on a time axis of the cells stops to thereby reduces the data volume, and processes the data in a record analyze control unit.

13. The data processing device according to claim 12, wherein
the method sets a cell which needs to determine whether or not a reduction of the cells is performed as a center cell, and sets a plurality of cell groups existing around the center cell as a group, in which the group is made by simplifying and unifying an operation of a neuron synapse and enables parallel processing by combining the cells.

14. The data processing device according to claim 12, wherein
the data volume reducing unit further reduces the center cell located at end points of a straight line coupling the center cell being remained in the processing layers to be perpendicular to the processing layers.

15. The data processing device according to claim 12, wherein
the cells record a reduction status of the data information.

16. The data processing device according to claim 12, wherein
the data volume reducing unit reduces the data information of n dimension in n-dimensional space to data information of (n−1)-dimensional composite body in (n+1)-dimensional space.

17. The data processing device according to claim 12, wherein
the data volume reducing unit reduces the data information of (n−1) dimension in (n+1)-dimensional space to 0-dimensional point form data information in $2^{n-1}(n+1)$-dimensional space.

18. The data processing device according to claim 12, wherein
the identification processing is weighting processing of assigning and adding a weight.

19. The data processing device according to claim 12, wherein
the developing unit reconstructs the cells being reduced in order from the upper layer to the lower layer of the processing layers.

20. The data processing device according to claim 12, wherein
the processing unit reduces and develops the data information for each similar data.

21. The data processing device according to claim 12, wherein
the record analyze control unit includes a method transforming a tree-formed data structure into a pulse signal and a method inputting/outputting and controlling data to retrieve, record, and construct a tree-formed structure from the pulse signal, in which the record analyze control unit controls a flow of other data by performing data masking on a circuit.

22. The data processing device according to claim 12, wherein the data information is an image, a sound, logic, and control.

* * * * *

UNITED STATES PATENT AND TRADEMARK OFFICE
CERTIFICATE OF CORRECTION

PATENT NO. : 8,948,523 B2
APPLICATION NO. : 13/149522
DATED : February 3, 2015
INVENTOR(S) : Nagato Oya It is certified that error appears in the above-identified patent and that said Letters Patent is hereby corrected as shown below:

IN THE SPECIFICATION

Lines 8 to 10 of column 10

Where it reads:

$$\forall D^n \subseteq R^n \exists \delta(D^n),$$

$$\{i_j, p_j, j, n\} \subset \mathbb{N}, 1 \leq j \leq n \delta(D^n) =$$

$$\left(\bigcup_{i_1=1}^{p1} D_{i_1}^{n-1}\right) \cup \left(\bigcup_{i_2=1}^{p2} D_{i_2}^{n-2}\right) \cup \ldots \cup \left(\bigcup_{i_n=1}^{pn} D_{i_n}^{0}\right) = \bigcup_{j=1}^{n}\left(\bigcup_{i_j=1}^{pj} D_{i_j}^{n-j}\right) \subset R^{n+1}$$

should correctly be indicated as shown below:

$$\forall D^n \subseteq R^n \exists \delta(D^n),$$

$$\{i_j, p_j, j, n\} \subset \mathbb{N}, 1 \leq j \leq n,$$

$$\delta(D^n) = \left(\bigcup_{i_1=1}^{p_1} D_{i_1}^{n-1}\right) \cup \left(\bigcup_{i_2=1}^{p_2} D_{i_2}^{n-2}\right) \cup \ldots \cup \left(\bigcup_{i_n=1}^{p_n} D_{i_n}^{0}\right) = \bigcup_{j=1}^{n}\left(\bigcup_{i_j=1}^{p_j} D_{i_j}^{n-j}\right) \subset R^{n-1}$$

Signed and Sealed this
Twentieth Day of October, 2015

Michelle K. Lee
*Director of the United States Patent and Trademark Office*

Page 1 of 1